US006937664B1

(12) United States Patent
Park et al.

(10) Patent No.: US 6,937,664 B1
(45) Date of Patent: Aug. 30, 2005

(54) SYSTEM AND METHOD FOR MULTI-SYMBOL INTERFACING

(75) Inventors: Yong E. Park, Los Altos, CA (US); Jeongsik Yang, Kyungpook (KR); Shuen-Chin Chang, San Jose, CA (US); Young Gon Kim, Kwangju (KR); Chiayao S. Tung, Cupertino, CA (US); Cindy Y. Ng, Cupertino, CA (US)

(73) Assignee: Integrated Memory Logic, Inc., Campbell, CA (US)

( * ) Notice: Subject to any disclaimer, the term of this patent is extended or adjusted under 35 U.S.C. 154(b) by 790 days.

(21) Appl. No.: 09/617,592

(22) Filed: Jul. 18, 2000

(51) Int. Cl.⁷ .............................................. H04L 27/00
(52) U.S. Cl. ...................... 375/259; 375/286; 375/287; 375/318
(58) Field of Search ................................ 375/257, 259, 375/282, 287, 342; 327/110, 53, 537; 326/82, 83; 341/58

(56) References Cited

U.S. PATENT DOCUMENTS

| | | | |
|---|---|---|---|
| 3,601,702 A | 8/1971 | Lender | 325/38 |
| 3,649,751 A | 3/1972 | So | 178/6 |
| 3,723,875 A | 3/1973 | Kawashima et al. | 325/13 |
| 3,723,880 A | 3/1973 | Van Gerwen | 325/38 |
| 3,761,818 A | 9/1973 | Tazaki et al. | 325/38 |
| 3,838,214 A | 9/1974 | Lind | 178/69.5 |
| 3,943,284 A | 3/1976 | Nelson | 178/58 |
| 4,010,421 A | 3/1977 | Lind | 325/38 |
| 4,123,710 A | 10/1978 | Stuart et al. | 325/38 |
| 4,837,821 A | 6/1989 | Kage | 380/9 |
| 5,166,956 A | 11/1992 | Baltus et al. | 375/17 |
| 5,255,287 A * | 10/1993 | Davies et al. | 375/287 |
| 5,313,496 A * | 5/1994 | de Goede | 375/342 |
| 5,450,023 A | 9/1995 | Yang et al. | 326/60 |
| 5,499,269 A | 3/1996 | Yoshino | 375/257 |
| 5,684,833 A | 11/1997 | Watanabe | 375/286 |
| 5,793,815 A | 8/1998 | Goodnow et al. | 375/286 |
| 5,793,816 A | 8/1998 | Hui | 375/286 |
| 5,898,886 A | 4/1999 | Hewitt | 395/890 |
| 5,915,105 A | 6/1999 | Farmwald et al. | 395/309 |
| 5,917,340 A * | 6/1999 | Manohar et al. | 326/82 |
| 5,953,263 A | 9/1999 | Farmwald et al. | 365/194 |
| 5,954,804 A | 9/1999 | Farmwald et al. | 710/36 |
| 5,995,443 A | 11/1999 | Farmwald et al. | 365/233 |
| 6,005,895 A | 12/1999 | Perino et al. | 375/288 |
| 6,031,472 A * | 2/2000 | Johnson et al. | 341/58 |
| 6,049,229 A * | 4/2000 | Manohar et al. | 326/83 |
| 6,545,514 B2 * | 4/2003 | Barrow | 327/110 |

OTHER PUBLICATIONS

RAMBUS Advance Information; Quad 3.125Gbps Rambus SerDes Cell; Version 0.1; pp. 1–2, date unknown.
RAMBUS Signaling Technologies; RSL; QRSL and SerDes Technology Overview; pp. 1–3, date unknown.

* cited by examiner

Primary Examiner—Stephen Chin
Assistant Examiner—Curtis Odom
(74) Attorney, Agent, or Firm—Sidley Austin Brown & Wood LLP

(57) ABSTRACT

An apparatus for providing multi-symbol signaling includes a multi-symbol encoder circuit. The multi-symbol encoder circuit is operable to encode data into a plurality of symbols, each symbol uniquely defined by a signal transition and a signal region in a carrier signal. A driver circuit, coupled to the multi-symbol encoder circuit, is operable to drive the carrier signal.

17 Claims, 15 Drawing Sheets

Multi-Symbol CMS Receiver

Multi-Symbol Transmitter (differential)

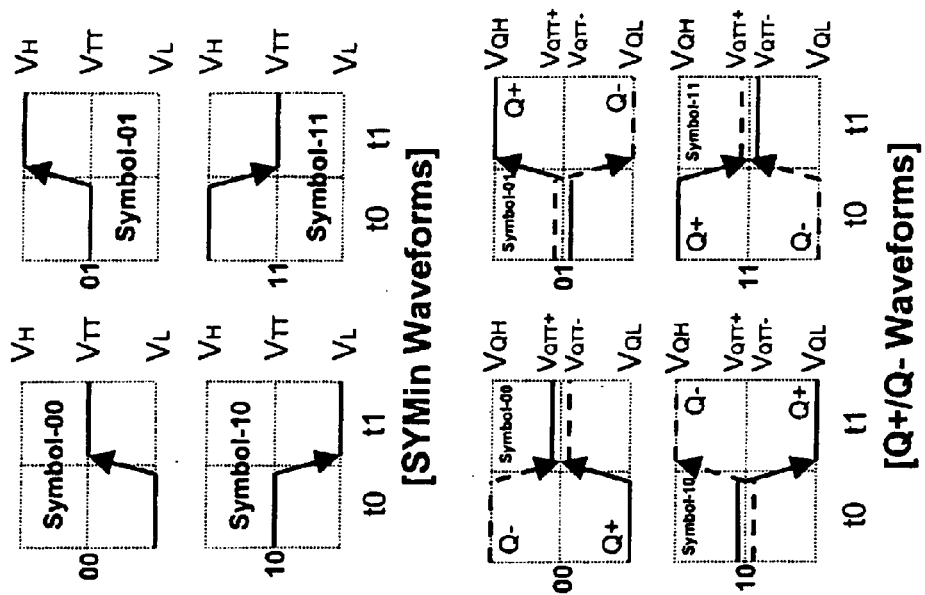
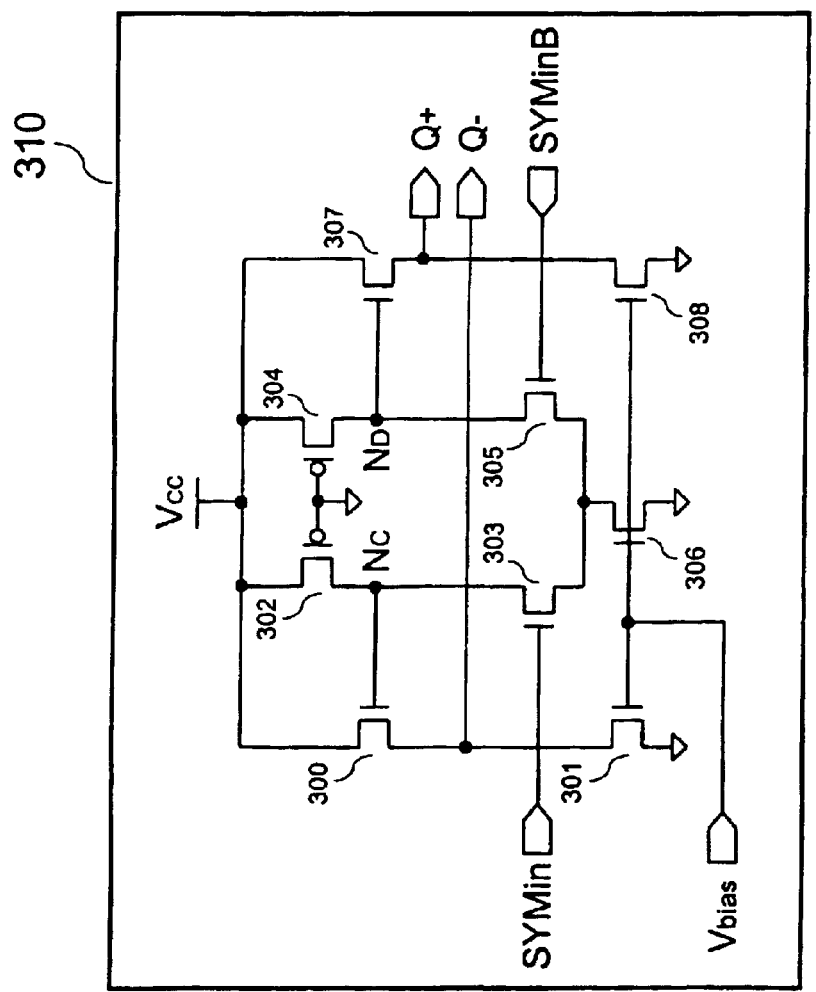
Fig. 10

SYSTEM AND METHOD FOR MULTI-SYMBOL INTERFACING

CROSS-REFERENCE TO RELATED PATENT APPLICATION

This application relates to the subject matter disclosed in the following co-pending United States Applications:

U.S. patent application Ser. No. 09/135,986 filed on Aug. 17, 1998, entitled "Advanced Input/Output Interface For Integrated Circuit Device;"

U.S. patent application Ser. No. 09/369,636 filed on Aug. 6, 1999, entitled "Input/Output Interfacing For A Semiconductor Chip;" and U.S. patent application Ser. No. 09/452,274 filed on Nov. 30, 1999, entitled "Universal Synchronization Clock And Skew Correction In A Bus System."

The above co-pending applications are assigned to the present Assignee and are incorporated herein by reference.

TECHNICAL FIELD OF THE INVENTION

The present invention relates generally to the field of interfacing, and more particularly, to a system and method for multi-symbol interfacing.

BACKGROUND OF THE INVENTION

In the electronic arts, data and information is routinely communicated or transferred between various devices, such as, for example, two computers, two integrated circuit (IC) devices, two conductive nodes, etc. Typically, such data/information is conveyed via one or more electrical signals carried over a suitable channel. Exemplary channels include copper wire, printed circuit board (PCB) trace, metallization line, and the like. As electronics have improved, there has been a corresponding need to transfer data/information at ever higher rates. High-speed transfer, however, has been hindered by a number of factors including, for example, limitations of the signaling technology used to transfer data/information over carrier channels and also the bandwidth of the channels themselves.

SUMMARY OF THE INVENTION

The present invention provides a system and method which implement a multi-symbol signaling technique for the transfer of data and information from an originating element to a destination element, each of which can be some electrical device (e.g., computer, IC device, node, etc.). In this technique, a number of symbols are used to transfer or convey bits of data/information in a signal. In one embodiment, each symbol transfers multiple bits of data/information. Each symbol may be defined by some unique combination of a particular transition of the carrier signal and a particular signal region. A transition can be, for example, a rise from a lower signal level to a higher signal level (a rising transition) or, alternatively, a drop from a higher signal level to a lower signal level (a falling transition). A region can be, for example, any signal level above a predetermined voltage (an upper region) or, alternatively, any signal level below a predetermined voltage (a lower region).

The originating element outputs a transmission signal with the symbols. When the transmission signal is received by the destination element, it is sampled multiple times (i.e., "multi-sampled") for each symbol. This obtains at least a first and a second sampled values. The first and second sampled values are compared against each other to determine the defining transition of the symbol. For example, assuming that the first sample is taken before the second sample, if the first sampled value is greater than the second sampled value, then the transition is falling. On the other hand, if the first sampled value is less than the second sampled value, then the transition is rising. In addition, the two sampled values are averaged and further processed to create a "Q+avg" and a "Q−avg," which may serve as "predetermined" voltages. Q+avg and a Q−avg are then considered against each other. If the value of Q+avg is greater than the value of Q−avg, then the symbol lies within the upper region. If the value of Q+avg is less than the value of Q−avg, then the symbol lies within the lower region. Once the transition and region for the symbol are determined, the symbol can be identified and then interpreted to recover the corresponding data/information.

According to an embodiment of the present invention, an apparatus for providing multi-symbol signaling includes a multi-symbol encoder circuit. The multi-symbol encoder circuit is operable to encode data into a plurality of symbols, each symbol uniquely defined by a signal transition and a signal region in a carrier signal. A driver circuit, coupled to the multi-symbol encoder circuit, is operable to drive the carrier signal.

According to another embodiment of the present invention, an apparatus is provided for recovering data from multi-symbol signaling. The apparatus includes a pre-amplifier which is operable to receive a carrier signal conveying a plurality of symbols. Each symbol is uniquely defined by a signal transition and a signal region in the carrier signal; each symbol represents a plurality of data. A region detector and a transition detector are coupled to the pre-amplifier. The region detector is operable to determine the defining signal region for each symbol. The transition detector is operable to determine the defining signal transition for each symbol.

According to yet another embodiment of the present invention, a method for providing multi-symbol signaling includes: receiving data for output from an originating device; encoding the data into a plurality of symbols, each symbol uniquely defined by a signal transition and a signal region in a carrier signal; and transmitting the carrier signal out of the originating device to a destination device.

According to still another embodiment of the present invention, a method for recovering data from multi-symbol signaling includes: receiving a carrier signal conveying a plurality of symbols, each symbol uniquely defined by a signal transition and a signal region in the carrier signal, each symbol representing a plurality of data; determining the defining signal region for each symbol; and determining the defining signal transition for each symbol.

According to still yet another embodiment of the present invention, a system is provided for multi-symbol signaling between monolithic semiconductor devices. The system includes a transmitter circuit and a receiver circuit. The transmitter circuit is integral to a first monolithic semiconductor device. The transmitter circuit is operable to encode a sequence of data into a plurality of symbols, each symbol uniquely defined by a signal transition and a signal region. The transmitter circuit is operable to output a transmission signal conveying the plurality of symbols. The receiver circuit is integral to a second monolithic semiconductor device. The receiver circuit is operable to receive the transmission signal conveying the plurality of symbols and to recover the sequence of data by detecting the signal transition and the signal region for each symbol.

A technical advantage of the present invention includes providing a transition of signal level in each symbol used to transfer data. The DC level of a channel may drift due to line characteristics when the same signal level appears on the channel over multiple clock cycles. In particular, capacitive and inductive characteristics of a line may cause the DC level to rise or fall over time. Because the present invention provides a transition in each symbol, the signal level in the channel changes with each clock cycle, and thus, capacitive and inductive charging on the line is minimized or attenuated with the present invention.

Another technical advantage of the present invention includes encoding data using symbols which can be interpreted without reference to absolute values. This is accomplished by defining symbols with signal transitions and signal regions. To recover at least a portion of the data, two samples of signal level are taken for each symbol. For each sample, two differentials are generated. The differentials are compared against each other. The relative positioning (i.e., higher or lower) of the differentials is considered in determining how to decode data. To recover another portion of data, each set of differentials is averaged. The averages are then considered against each other in determining how to decode the data. Because the decoding of symbols is not accomplished using absolute reference levels, this multi-symbol signaling technique is not as susceptible as previously developed techniques to the problems associated with signal drift and individual line characteristics. Accordingly, the present invention provides for accurate data recovery.

Yet another technical advantage of the present invention includes providing a signaling technique which uses a predetermined voltage (e.g., a termination voltage ($V_{TT}$)) as a reference. This eliminates the need for a separate reference voltage source ($V_{REF}$).

Accordingly, the signaling technique requires less power. Furthermore, the signaling technique provides more stable DC levels, thus enabling faster data transfer rates.

Other important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 6C illustrates output waveforms for the embodiment of multi-symbol transmitter of FIG. 6B;

FIG. 10 is a schematic diagram of a pre-amplifier and corresponding illustrations of input and output waveforms, in accordance with an embodiment of the present invention;

DETAILED DESCRIPTION OF THE PREFERRED EMBODIMENTS

The preferred embodiments of the present invention and their advantages are best understood by referring to FIGS. 1 through 14 of the drawings. In these drawings, like numerals are used for like and corresponding parts.

Architecture

Figure 1:
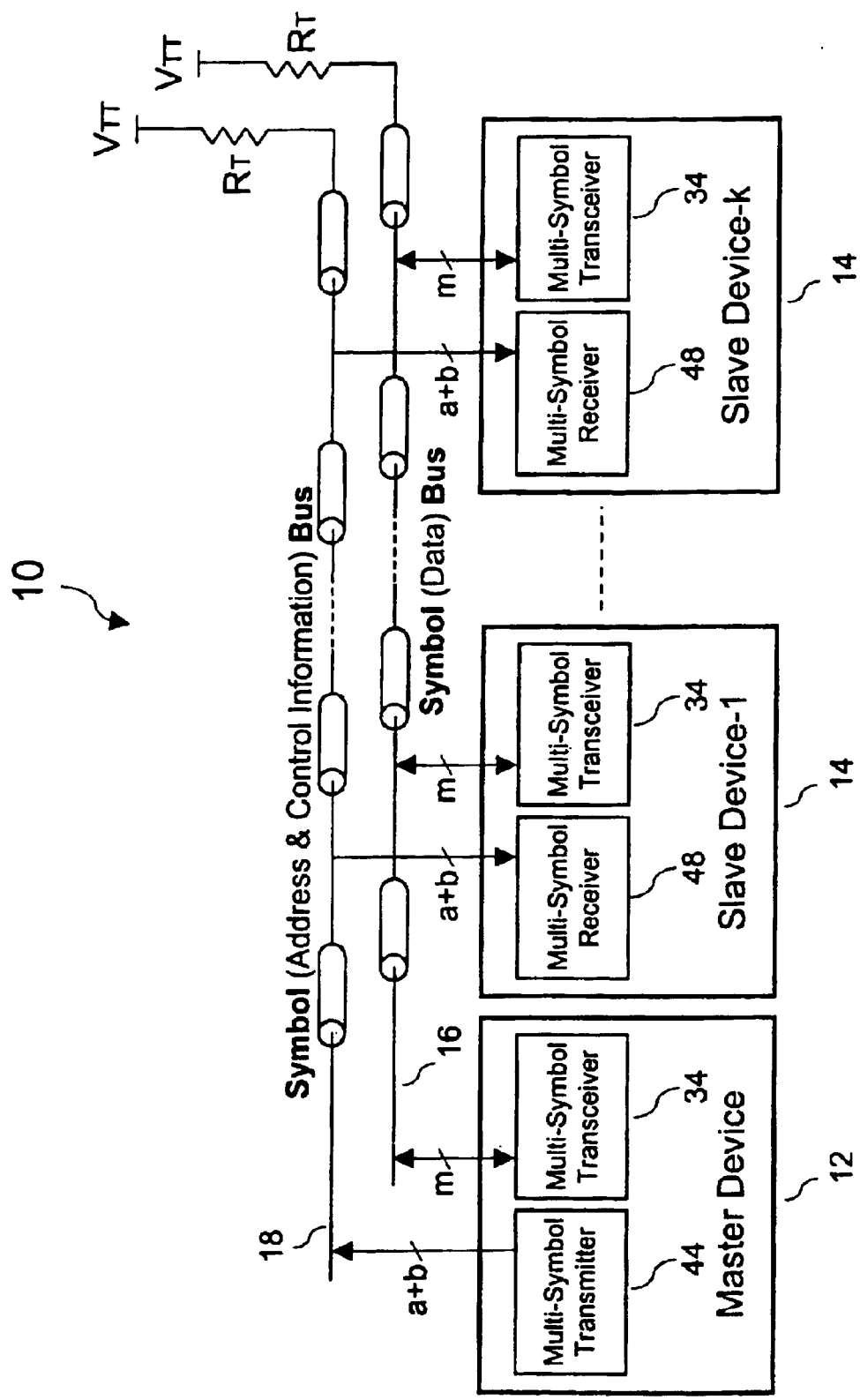
FIG. 1 illustrates an exemplary architecture in which a multi-symbol signaling technique, in accordance with an embodiment of the present invention, can be used.

FIG. 1 illustrates an exemplary architecture 10 in which a multi-symbol signaling technique, according to an embodiment of the present invention, can be used. As depicted, architecture 10 includes a master device 12 and one or more slave devices 14. Master device 12 and slave devices 14 are electronic devices connected in a master/slave distributed system. Master device 12 controls this distributed system. Master device 12 can communicate with each of slave devices 14, and also with other master devices (not shown). Each of slave devices 14 can only communicate with master device 12. Each of master device 12 and slave devices 14 can be any suitable electronic device, such as, for example, a computer, an integrated circuit (IC) device, a conductive node, etc.

To provide a context for the present invention, the remainder of this description will primarily describe master device 12 and slave devices 14 as IC devices. In particular, master device 12 may be described as a processing device, and slave devices 14 may be described as memory devices. As a processing device, master device 12 generally functions to process data and other information, which may be transferred to and from other devices for control, addressing, and other operations. A processing device may comprise a microcontroller, a microprocessor, a central processing unit (CPU), a co-processor, a peripheral controller, a graphic controller (two-dimensional or three-dimensional), a mass storage controller, or other semiconductor chip for processing data and information. As a memory device, each slave device 14 generally functions to store the data and other information. For this purpose, each slave device 14 can be any suitable IC memory including dynamic random access memory (DRAM), static random access memory (SRAM), non-volatile random access memory (NVRAM), and read only memory (ROM), such as erasable programmable ROM (EPROM), electrically erasable programmable ROM (EEPROM), and flash memory. Master device 12 and slave devices 14 can each be implemented as a separate monolithic, semiconductor device. Master device 12 and slave devices 14 can each be separately packaged in suitable packaging (e.g., plastic, ceramic, micro-ball grid array (MBGA), or chip scale package (CSP)) with suitable leads or other connecting points extending therefrom (not shown). Alternatively, master device 12 and slave devices 14 can be combined within a single package. It should be understood, however, that the present invention is not limited to this particular context, but has broader applicability. For example, master device 12 and slave devices 14, acting as originating and destination elements, can be formed on a single monolithic, semiconductor device.

Data and information may be transferred or communicated between master device 12 and slave devices 14. For any given transfer of data/information, the device originating the data/information is considered to be the originating element, and the device for which the data/information is destined is considered to be the destination element.

The transfer of data/information may occur through one or more suitable channels. In this context, the channels may be implemented in a symbol bus 16 (for data) and a symbol bus 18 (for address and control information). These buses connect master device 12 and slave devices 14. As used herein, the terms "connected," "coupled," or any variant thereof, mean any connection or coupling, either direct or indirect, between two or more elements; the connection or coupling can be logical or physical. Symbol bus 16 (for data) may have a bus width of m bits. Symbol bus 18 (for address and control information) may have a bus width of a+b bits.

Symbol buses 16 and 18 may each comprise one or more traces on a printed circuit board (PCB). Each of the buses 16 and 18 may implement a suitable connection between electronic devices. Such connection can be, for example, a specialized connection (e.g., MX-ARC DDR) or an industry standard bus connection (e.g., a PC-100, PC-133, PC-200, or PC-266 DDR). Symbol buses 16 and 18 are each provided with a termination resistor ($R_T$) connected to a termination voltage source ($V_{TT}$). The termination resistors serve as a pull-up resistors to match bus impedance, thus minimizing signal reflection on the respective buses. The termination voltage source ($V_{TT}$) may serve as a predetermined voltage, which can be used as a reference.

Numerous signals (generated within or received by any of master device 12 or slave devices 14) convey, or control or coordinate the conveyance of, data/information to and from the devices via buses 16 and 18. In the present context, these signals include data signals for conveying data, addressing signals for identifying specific memory cells into and from which data is to be written or read, and control signals for coordinating or controlling the access, reading, and/or writing of the data.

According to an embodiment of the present invention, a multi-symbol signaling technique can be used for the signaling. In this technique, a number of symbols are used to transfer or convey bits of data/information in a signal from one electronic device to another. Each symbol may be uniquely defined or characterized by a particular combination of signal region and transition in signal value. A region can be, for example, a region above a predetermined voltage (e.g., a termination voltage ($V_{TT}$) of the carrier channel) or, alternatively, a region below the predetermined voltage. A transition can be, for example, a rise from a lower signal level to a higher signal level (a positive slope), or alternatively, a drop from a higher signal level to a lower signal level (a negative slope). Each symbol may transfer multiple bits of data/information in a single clock (CLK) cycle.

To determine the defining transition of a symbol, at least two samples of signal value may be taken from the carrier signal (i.e., "multi-sampling"). The two sampled signal values are then compared. If the first sampled signal value is lower than the second sampled signal value, there is a rising transition in the symbol. Alternatively, if the first sampled signal value is higher than the second sampled signal value, there is a falling transition in the symbol. In addition, to determine the defining region of a symbol, the two sampled signal values are averaged and then considered against the value of the predetermined voltage. If the average value of the two samples is greater than the predetermined voltage value, then the symbol lies within the upper region. If the average value of the two samples is less than the predetermined voltage value, then the symbol lies within the lower region. Once the transition and region for the symbol are determined, the symbol can be identified and then interpreted to recover the corresponding data/information.

A technical advantage of the present invention includes encoding data using a symbols which can be interpreted without reference to absolute values. This is accomplished by defining symbols with signal transitions and signal regions. To recover at least a portion of the data, two samples of signal level are taken for each symbol. For each sample, two differentials are generated. The differentials are compared against each other. The relative positioning (i.e., higher or lower) of the differentials is considered in determining how to decode data. To recover another portion of data, each set of differentials is averaged. The averages are then considered against each other in determining how to decode the data. Because the decoding of symbols is not accomplished using absolute reference levels, this multi-symbol signaling technique is not as susceptible as previously developed techniques to the problems associated with signal drift and individual line characteristics. Accordingly, the present invention provides for accurate data recovery.

To implement the multi-symbol signaling technique in architecture 10, master device 12 and slave devices 14 each comprise a multi-symbol transceiver 34 connected to Symbol bus 16 for conveying data signals. Furthermore, master device 12 may include a multi-symbol transmitter 44 and slave devices 14 may each comprise a multi-symbol receiver 48 for transmitting and receiving control and address information signals. In one embodiment, each multi-symbol transceiver 34 may comprise a multi-symbol transmitter 44 and a multi-symbol receiver 48. Multi-symbol transceivers 34, multi-symbol transmitter 44, and multi-symbol receivers 48 are described below in more detail.

Multi-Symbol Signaling Scheme

Figure 2:
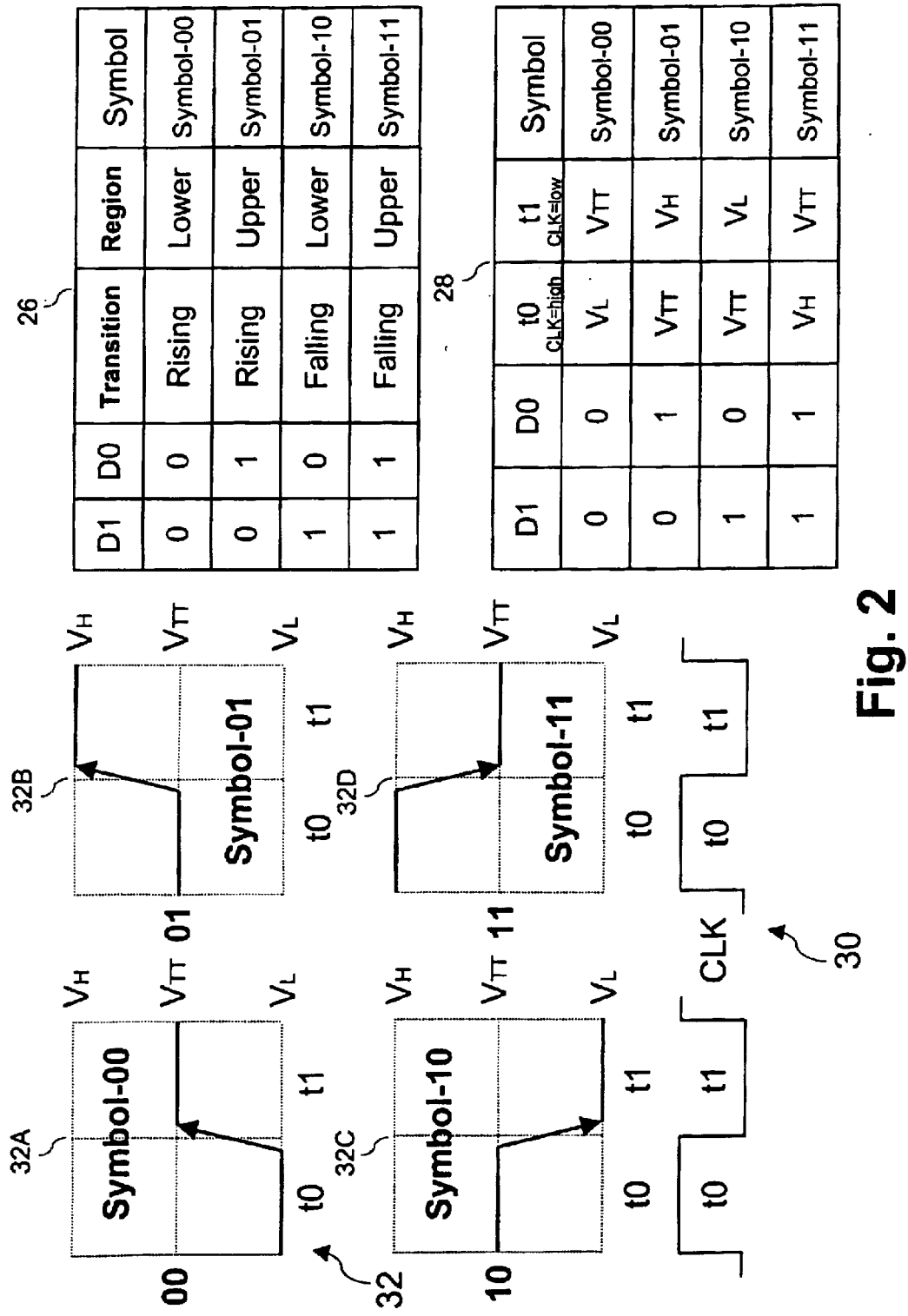
FIG. 2 illustrates an exemplary embodiment for a multi-symbol signaling scheme, in accordance with an embodiment of the present invention.

FIG. 2 illustrates an exemplary embodiment for a multi-symbol signaling scheme 30, according to an embodiment of the present invention. Multi-symbol signaling scheme 30 can be used to transfer data and information between an originating element and a destination element.

The multi-symbol signaling scheme 30 comprises a plurality of symbols 32, which are separately referred to by reference numerals 32A, 32B, 32C, and 32D. These symbols 32 are separately designated "symbol-00," "symbol-01," "symbol-10," and "symbol-11." Each symbol 32 can be carried or appear as a waveform in a carrier signal.

Each symbol 32 is uniquely defined by a transition of signal level and a signal region. As depicted, three signal levels are available in the carrier signal. These levels, in increasing order, are as follows: voltage low ($V_L$), bus termination voltage ($V_{TT}$), and voltage high ($V_H$). In one embodiment, the value of $V_L$ can be $V_{TT}$ minus $\Delta V$, and the value of $V_H$ can be $V_{TT}$ plus $\Delta V$, where $\Delta V$ is selected so that there is sufficient signal-to-noise ratio to properly receive the carrier signal for a given channel (or bus).

A transition of signal level can be either rising from one signal level to another or falling from one signal level to another. Referring to the depicted symbols 32, symbol-00 and symbol-01 are each defined in part by a rising transition. In particular, in symbol-00, there is a rising transition from $V_L$ to $V_{TT}$, and in symbol-01, there is a rising transition from $V_{TT}$ to $V_H$. In like manner, symbol-10 and symbol-11 are each defined in part by a falling transition. In particular, in symbol-10, there is a falling transition from $V_{TT}$ to $V_L$, and in symbol-11, there is a falling transition from $V_H$ to $V_{TT}$.

A signal region may be generally characterized as a region above or below a particular demarcation signal level, or as a region between two demarcation signal levels. As depicted, an upper region may be defined as a region lying above a demarcation of the $V_{TT}$ signal level, or alternatively, as a region between the demarcations of the $V_{TT}$ and $V_H$ signal levels. A lower region may be defined as a region lying below the demarcation of the $V_{TT}$ signal level, or alternatively, as a region between the demarcations of the $V_{TT}$ and $V_L$ signal levels. Referring to the depicted symbols, symbol-00 and symbol-10 each lie within the lower region (i.e., below $V_{TT}$, or between $V_L$ and $V_{TT}$). Symbol-01 and symbol-11 each lie within the upper region (i.e., above $V_{TT}$, or between $V_{TT}$ and $V_H$).

With the signal level transitions and signal regions described above, each symbol 32 may be uniquely defined by a particular combination of transition and region. That is, symbol-00 is uniquely defined by a rising transition and lying within the lower region. Symbol-01 is uniquely defined by a rising transition and lying within the upper region. Symbol-10 is uniquely defined by a falling transition and lying within the lower region. Symbol-11 is uniquely defined by a falling transition and lying within the upper region. This is reflected in a table 26.

Each symbol 32 may be transferred in a single clock (CLK) cycle. The defining transition of each symbol may occur approximately halfway through the clock cycle (and thus may coincide with a rising or falling edge of the clock signal). In order to identify a symbol, a first sample may be taken of a carrier signal during a first time period to (which can be the first half of a clock cycle) and a second sample may be taken of the carrier signal during a second time period ti (which can be the second half of the same clock cycle).

Because the upper and lower regions can be characterized by the signal levels of $V_L$, $V_{TT}$, and $V_H$, each symbol 32 may be alternatively defined and identified by the respective signal levels occurring at the first and second halves of a clock signal. That is, symbol-00 is uniquely defined by a signal level $V_L$ at time period to and a signal level $V_{TT}$ at time period t1. Symbol-01 is uniquely defined by a signal level $V_{TT}$ at time period t0 and a signal level $V_H$ at time period t1. Symbol-10 is uniquely defined by a signal level $V_{TT}$ at time period t0 and a signal level $V_L$ at time period t1. Symbol-11 is uniquely defined by a signal level $V_H$ at time period t0 and a signal level $V_{TT}$ at time period t1. This is reflected in a table 28.

Each symbol 32 may be used to transfer multiple bits of data/information. In the depicted embodiment, each symbol 32 transfers two bits of data/information. These bits may be referred to as "D0" and D1." Table 28 provides an exemplary encoding for the bits D0 and D1 as conveyed by symbol-00, symbol-01, symbol-10, and symbol-11. In particular, symbol-00 transfers a "low" or logic-0 value for each of D0 and D1. Symbol-01 transfers a "high" or logic-1 value for D0 and a "low" or logic-0 value for D1. Symbol-10 transfers a "low" or logic-0 value for D0 and a "high" or logic-1 value for D1. Symbol-11 transfers a "high" or logic-1 value for each of D0 and D1.

An advantage of the present invention includes defining a symbol in part by a transition of signal level, rather than an actual value for a signal level. If the actual values for signal levels drift together (e.g., $V_L$, $V_{TT}$, and $V_H$ either all move up or all move down), then the transition in signal level is independent of the actual values. For example, even if the value of $V_L$ rises by 0.5 v, it will always be lower than $V_{TT}$ if the value of $V_{TT}$ rises in the same way (i.e., by 0.5 v).

Furthermore, even if the actual values for signal levels do not drift together (e.g., $V_L$ may move up while $V_{TT}$ moves down), the transition in signal level can still be determined in all but the most severe cases. That is, the transition can be determined as long as the voltage difference between $V_H$ and $V_{TT}$, and between $V_{TT}$ and $V_L$, is greater than $\Delta V$. $\Delta V$ is determined by the channel characteristics and the sensitivity of various elements of the multi-symbol transceiver 34 (as described herein). For most applications, as long as $V_H$ is 1000 mV higher than $V_{TT}$, and $V_{TT}$ is 1000 mV higher than $V_L$, the symbols carrier signal can be read properly.

Thus, the multi-symbol signaling technique of the present invention provides highly robust capability to reject common-mode noise, as well as insensitivity to DC level drift in a carrier signal. Accordingly, the signaling technique supports reading of a signal with small margins at very high speed.

Master Device

Figure 3:
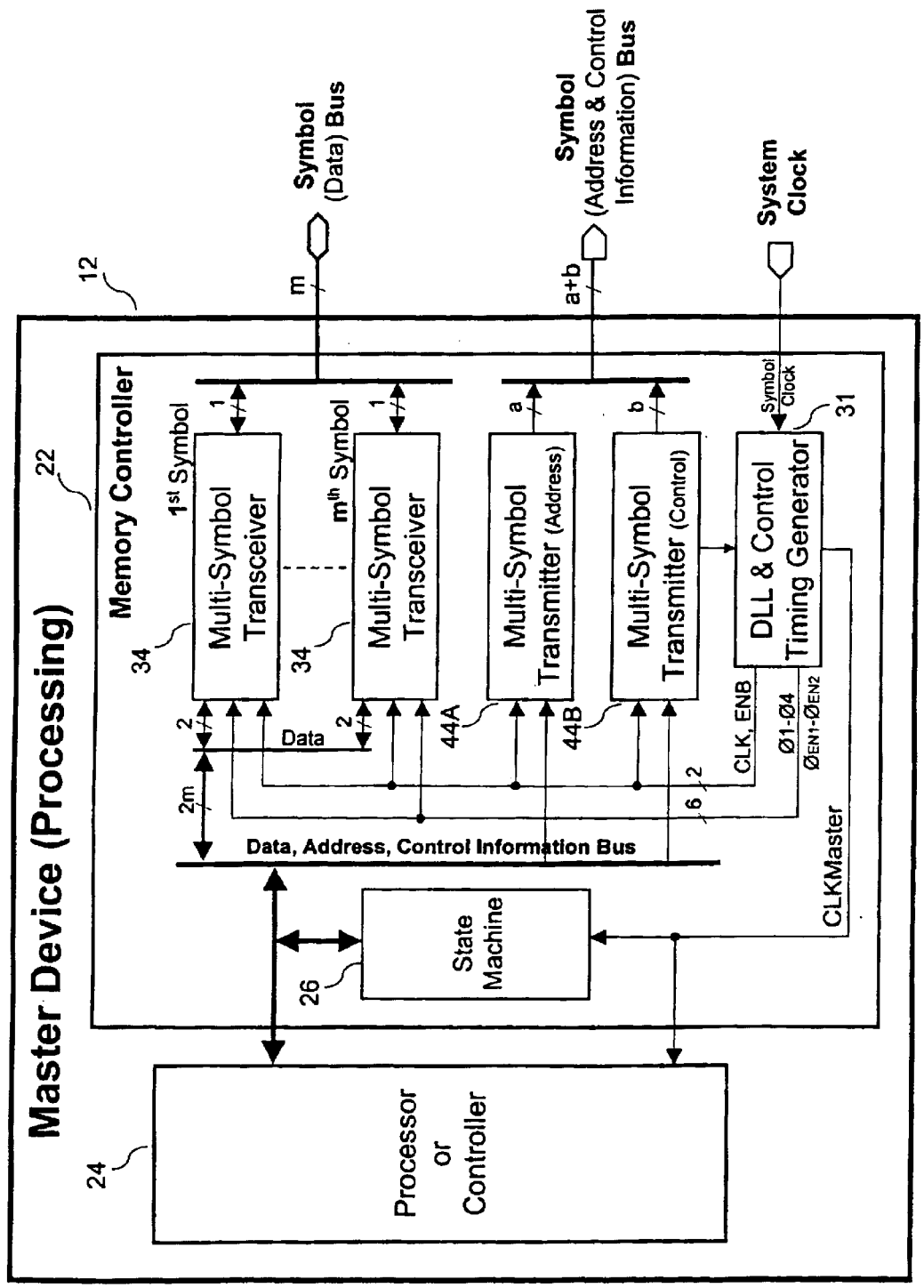
FIG. 3 is a block diagram of a master device having circuitry for implementing the multi-symbol signaling technique, in accordance with an embodiment of the present invention.

FIG. 3 is a block diagram of a master device 12 having circuitry for implementing the multi-symbol signaling technique, in accordance with an embodiment of the present invention. As shown, master device 12 is implemented as a processing device.

Master device 12 transfers data and other information to and from, for example, a slave device 14, for control, addressing, processing, and other operations. As depicted, master device 12 includes a memory controller 22 coupled to a processor 24. Processor 24 functions to process data and other information, which may be transferred to and from the memory device for control, addressing, and other operations. Memory controller 22 directs the transfer of data/information between processor 24 and the slave device.

Memory controller 22 includes a state machine 26, a delay locked loop (DLL) and control timing generator 31, m-number of multi-symbol transceivers 34, and a plurality of multi-symbol transmitters 44 (separately labeled 44A and 44B). State machine 26 generates all necessary interface control timings and addresses to perform one or more predetermined logical operations on data. These operations place state machine 26 in various states which control the input/output of data to and from master device 12.

DLL and control timing generator 31 receives an input system clock signal, which serves as symbol clock within master device 12. DLL and control timing generator 31 generates a number of clock, phase, and other signals. These signals include a clock (CLK) signal, an enable (ENB) signal, a phase $\varnothing 1$ signal, a phase $\varnothing 2$ signal, a phase $\varnothing 3$ signal, a phase $\varnothing 4$ signal, a phase $\varnothing_{EN1}$ signal, a phase $\varnothing_{EN2}$ signal, and a master clock CLKMaster signal. These signals are used in master device 12 for timing, synchronization, and other things.

For example, the clock (CLK) signal can be used for encoding data/information according to the multi-symbol signaling technique described herein. in one embodiment, the symbol clock runs at one-half the frequency of the clock (CLK) signal, thereby facilitating the design and implementation of DLL and control timing generator 31.

Each multi-symbol transceiver 34 and multi-symbol transmitter 44 is coupled to DLL and control timing generator 31 and receives the signals therefrom. Each multi-symbol transceiver 34 functions, among other things, to encode data being sent out of master device 12 into one or more symbols, drive outgoing signals, sample incoming signals, and reformat or recover data from the sampled incoming signals. Multi-symbol transceivers 34 transmit and receive signals on an m-bit Symbol bus. Each multi-symbol transmitter 44 functions to encode information being sent out of master device 12 into one or more symbols and drive outgoing signals. Multi-symbol transmitter 44A may be provided for address information and multi-symbol transmitter 44B may be provided for control information. Multi-symbol transmitters 44A, 44B transmit signals on a Symbol bus which may be a+b bits wide.

DLL and control timing generator 31, multi-symbol transceivers 34, and multi-symbol transmitters 44A, 44B of master device 12 cooperate to provide an interface for the input and output of data/information to and from master device 12. According to an embodiment of the present invention, DLL and control timing generator 31, multi-symbol transceivers 34, and multi-symbol transmitters 44A, 44B implement the multi-symbol signaling technique described herein.

Slave Device

Figure 4:
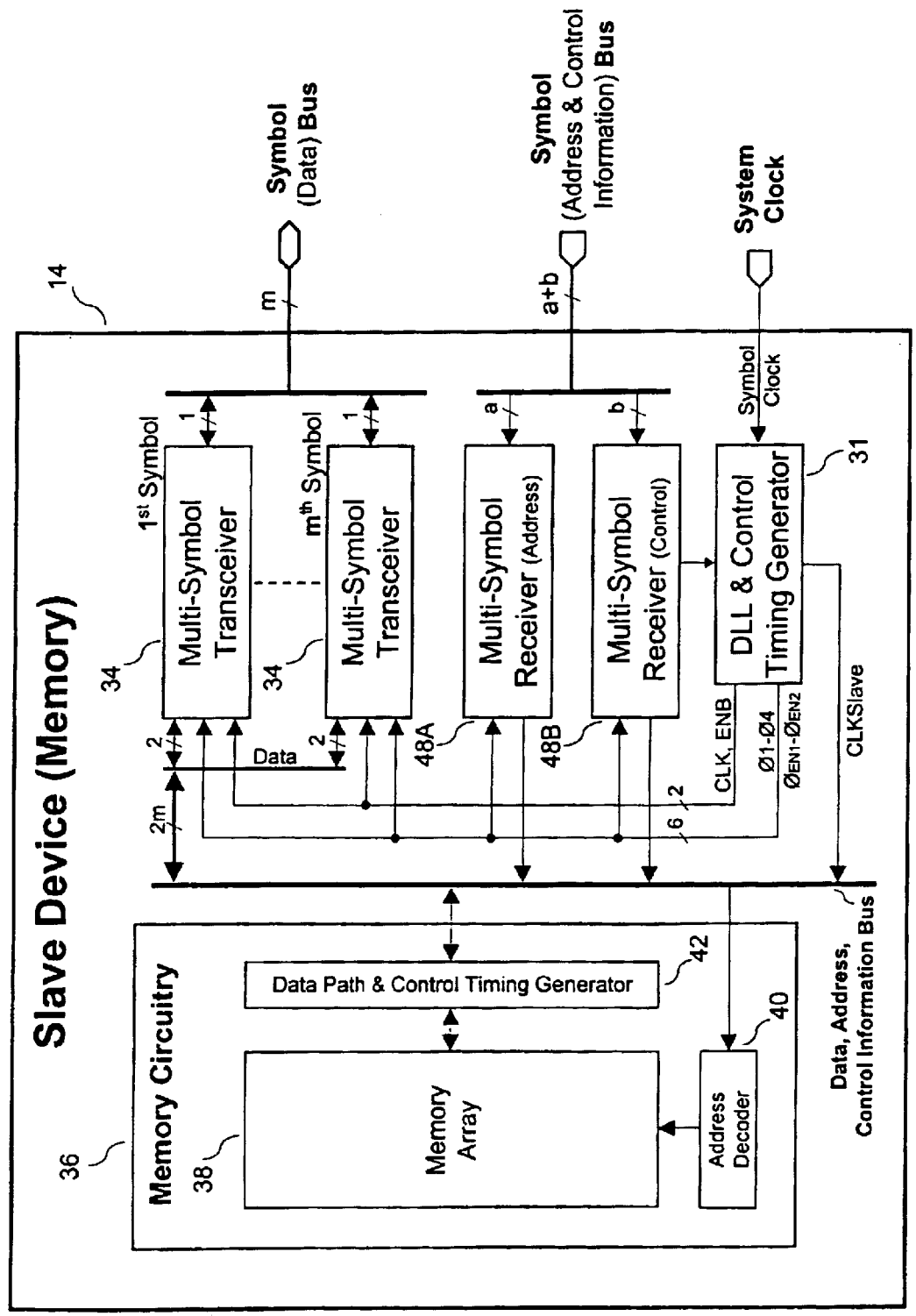
FIG. 4 is a block diagram of a slave device having circuitry for implementing the multi-symbol signaling technique, in accordance with an embodiment of the present invention.

FIG. 4 is a block diagram of a slave device 14 having circuitry for implementing the multi-symbol signaling technique, in accordance with an embodiment of the present invention. As shown, slave device 14 is implemented as a memory device. As depicted, slave device 14 includes DLL and control timing generator 31, m-number of multi-symbol transceivers 34, a plurality of multi-symbol receivers 48 (separately labeled 48A and 48B), and memory circuitry 36.

Memory circuitry 36 comprises a memory array 38. Memory array 38 includes a plurality of memory cells (not shown), each of which functions to maintain data. In particular, separate bits of data may be written into, stored, and read out of each of these memory cells. The memory cells may be fabricated in any suitable technology, such as metal-oxide semiconductor (MOS) technology, according to techniques well-known and understood by those skilled in the art of IC memory.

Further, these memory cells of memory array 38 can be organized in any suitable structure, such as, for example, a matrix of rows and columns. A typical architecture connects all cells in a row to a common row line, often referred to as a "word line," and all cells in a column to a common column line, often referred to as a "bit line." Any suitable addressing scheme, such as row-column (i.e., X-Y coordinate) addressing or content-addressing, can be used to access the memory cells within memory array 38.

Memory circuitry 36 also comprises address decoder circuitry 40 and other circuitry 42 which support the storage, maintenance, and/or access of information in the memory cells of memory array 38. For example, address decoder circuitry 40 may include a. number of row address buffers, column address buffers, row decoders, column decoders, and the like for accessing the various memory cells. Furthermore, circuitry 42 may include various timing generators, such as an output enable (OE) clock generator and a write enable (WE) clock generator, for enabling the reading and writing of data out of and into the memory cells. Circuitry 42 may also include circuitry for controlling and providing a data path for the transfer of data.

DLL and control timing generator 31 receives an input system clock signal, which serves a symbol clock within slave device 14. DLL and control timing generator 31 generates a number of clock, phase, and other signals. These signals include a clock (CLK) signal, an enable (ENB) signal, a phase $\varnothing 1$ signal, a phase $\varnothing 2$ signal, a phase $\varnothing 3$ signal, a phase $\varnothing 4$ signal, a phase $\varnothing_{EN1}$ signal, a phase $\varnothing_{EN2}$ signal, and a slave clock CLKSlave signal. These signals are used in slave device 14 for timing, synchronization, and other things.

As with master device 12, for example, the clock (CLK) signal can be used in slave device 14 for encoding data/information according to the multi-symbol signaling technique described herein. In one embodiment, the symbol clock runs at one-half the frequency of the clock (CLK) signal, thereby facilitating the design and implementation of DLL and control timing generator 31.

Each multi-symbol transceiver 34 and multi-symbol receiver 48 is coupled to DLL and control timing generator 31 and receives the signals therefrom. Each multi-symbol transceiver 34 functions, among other things, to encode data being sent out of slave device 14 into one or more symbols, drive outgoing signals, sample incoming signals, and reformat or recover data from the sampled incoming signals. Multi-symbol transceivers 34 transmit and receive signals on an m-bit Symbol bus. Each multi-symbol receiver 48 functions to receive incoming signals and recover information from one or more symbols contained therein. Multi-symbol receiver 48A may be provided for address information and multi-symbol receiver 48B may be provided for control information. Multi-symbol receivers 48A, 48B receive signals from a Symbol bus which may be a+b bits wide.

DLL and control timing generator 31, multi-symbol transceivers 34, and multi-symbol receivers 48A, 48B of slave device 14 cooperate to provide an interface for the input and output of data/information to and from slave device 14. According to an embodiment of the present invention, DLL and control timing generator 31, multi-symbol transceivers 34, and multi-symbol receivers 48A, 48B implement the multi-symbol signaling technique described herein.

Multi-Symbol Transceiver

Figure 5:
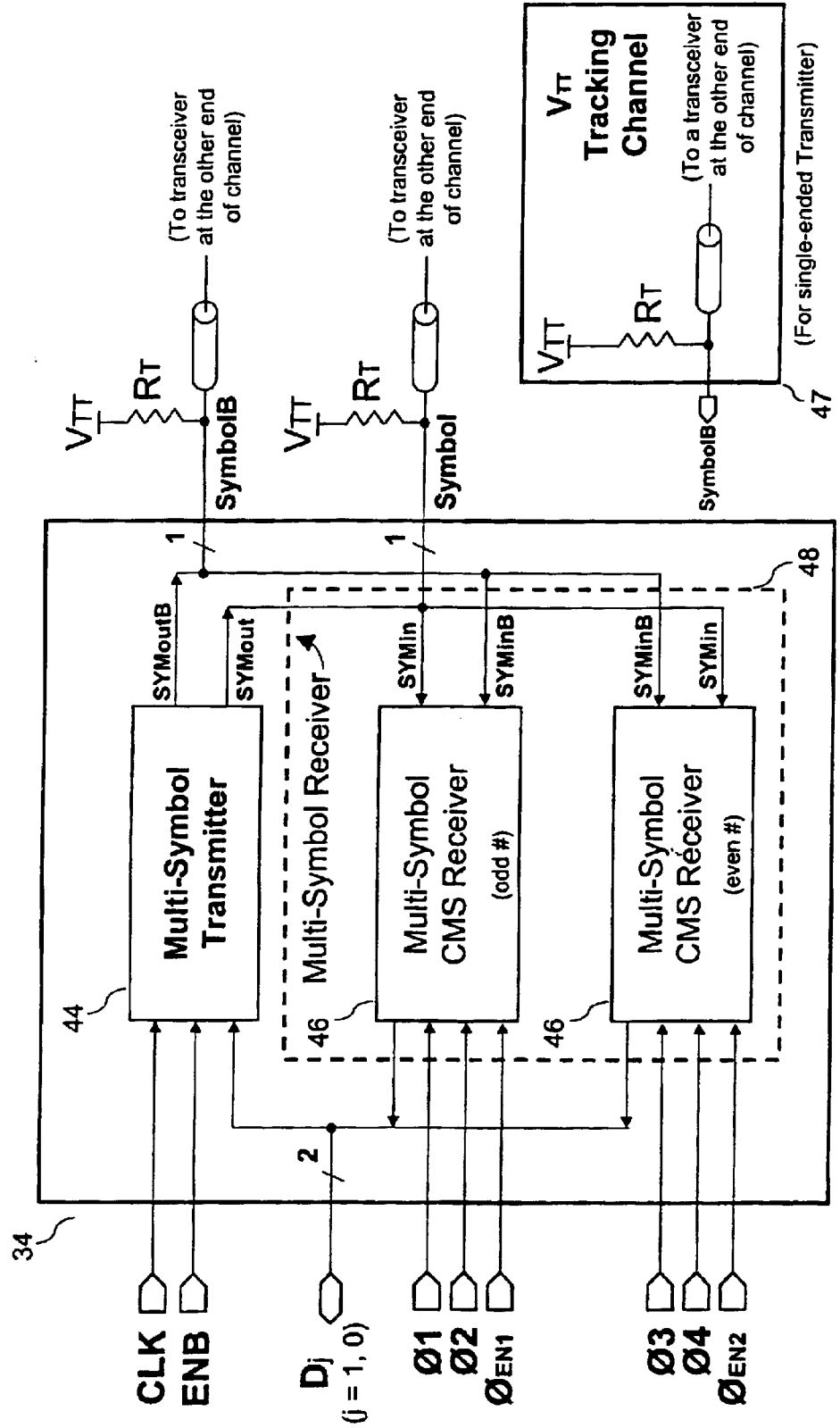
FIG. 5 is a block diagram of a multi-symbol transceiver, in accordance with an embodiment of the present invention.

FIG. 5 is a block diagram of a multi-symbol transceiver 34, according to an embodiment of the present invention. Multi-symbol transceiver 34 may be incorporated into any suitable electronic device which may act as an originating device or a destination device. This includes the master device 12 and slave devices 14 described with reference to FIG. 1. As depicted, multi-symbol transceiver 34 includes a multi-symbol transmitter 44 and a multi-symbol receiver 48. Multi-symbol receiver 48 comprises two multi-symbol correlated multi-sampling (CMS) receivers 46.

Multi-symbol transceiver 34 converts between one or more streams of data $D_j$ and a Symbol transmission signal. Data $D_j$ may comprise a number of data bits (in series or parallel data format), each of which can have value of logic-1 or logic-0. Data $D_j$ can be carried over a two-bit wide bus (j=1,0) into and out of multi-symbol transceiver circuit 34. The Symbol signal is a transmission signal in which the data bits are represented by a number of symbols (e.g., symbol-00, symbol-01, symbol-10, and symbol-11 shown in FIG. 2), each of which is uniquely defined by a particular combination of signal level transition and signal region. The Symbol signal can be either transmitted from or received by the electronic device into which multi-symbol transceiver 34 is incorporated. The Symbol signal is carried over a Symbol line into and out of multi-symbol transceiver 34.

In one embodiment, as depicted, multi-symbol transceiver 34 outputs and receives a SymbolB signal, which is the differential for the Symbol signal. The differential SymbolB signal is carried on a separate SymbolB line, which may be combined with the Symbol line in a twisted pair configuration. In a printed circuit board context, the Symbol signal and the differential SymbolB signal are carried on respective traces. The differential SymbolB signal carried over the SymbolB line serves to reduce the effects of electromagnetic interference (EMI) on the Symbol line. In an alternate embodiment, multi-symbol transceiver 34 may utilize a single-ended Symbol signal (i.e., without a differential SymbolB signal and separate SymbolB line).

For a Symbol signal transmitted out of the electronic device, multi-symbol transmitter 44 formats or encodes data $D_j$ as symbols in an outgoing signal, controls the slew rate of the signal, and drives the signal. With the encoded symbol format, data $D_j$ can be transmitted across a Symbol bus (connecting a plurality of electronic devices) at very high data rate and more reliably than with previously developed technologies and techniques. Multi-symbol transmitter 44 receives a clock (CLK) signal (which is derived from and synchronized with a system clock) and an enable (ENB) signal. As depicted, multi-symbol transmitter 44 outputs SYMout for the outgoing Symbol signal, and may generate and output a differential SYMoutB for a respective outgoing differential SymbolB signal.

An exemplary embodiment for a multi-symbol transmitter 44 supporting or using a single-ended Symbol signal is shown and described with reference to FIG. 6A. An exemplary embodiment for a multi-symbol transmitter 44 supporting or using both a Symbol signal and respective differential SymbolB signal is shown and described with reference to FIG. 6B.

For a Symbol signal received by the electronic device, multi-symbol receiver 48 may receive the incoming Symbol signal as SYMin and the differential SymbolB signal as SYMinB. Multi-symbol receiver 48 samples the incoming Symbol signal and recovers the real data $D_j$ using the sampled values. In one embodiment, each multi-symbol CMS receiver 46 multi-samples the incoming Symbol signal to detect a signal transition and a signal region for each symbol in the signal. The format of data $D_j$ can be either double data rate (DDR) format (if the clock (CLK) signal is twice the frequency of the system clock signal) or single data rate (SDR) format (if the clock (CLK) signal is the same frequency as the system clock signal).

One of the multi-symbol CMS receivers 46 may operate on one part of an incoming Symbol transmission signal, while the other may operate on another part of the incoming Symbol signal. For example, the data Dj (represented by corresponding symbols within the Symbol signal) may be divided equally based upon positioning in a stream or sequence. Data $D_j$ at odd-numbered positions in the sequence (i.e., first, third, fifth, etc. positions) are recovered by the first multi-symbol CMS receiver 46. Data $D_j$ at even-numbered positions in the sequence (i.e., second, fourth, sixth, etc. positions) are recovered by the second multi-symbol CMS receiver 46.

Each multi-symbol receiver circuit 46 can be timed with one or more phase (Ø) signals. As shown, one multi-symbol receiver circuit 46 receives a Ø1 signal, a Ø2 signal, $Ø_{EN1}$ signal, while the other multi-symbol receiver circuit 46 receives a Ø3 signal, a Ø4 signal, $Ø_{EN2}$ signal. Each multi-symbol receiver circuit 46 may receive a voltage signal of a predetermined voltage, such as, for example, a bus termination voltage ($V_{TT}$) signal.

A $V_{TT}$ tracking channel circuit 47 outputs the bus termination voltage ($V_{TT}$) signal through a termination resistor $R_T$. The bus termination voltage ($V_{TT}$) signal with a termination resistor $R_T$ can be used to emulate or track the physical characteristics of the channel over which the incoming Symbol signal is received.

For an embodiment of multi-symbol transmitter 44 supporting or using a single-ended Symbol signal, the $V_{TT}$ tracking channel circuit 47 is used to provide the SymbolB signal to the SYMinB input of multi-symbol CMS receiver circuits 46 of a destination element. In this case, the voltage value for the SymbolB is approximately $V_{TT}$. For an embodiment for a multi-symbol transmitter 44 supporting or using both a Symbol signal and respective differential SymbolB signal, the SYMoutB signal from multi-symbol transmitter 44 is fed to the SYMinB input of the multi-symbol CMS receiver circuits 46 of a destination element.

Multi-Symbol Transmitter

Figure 6A:
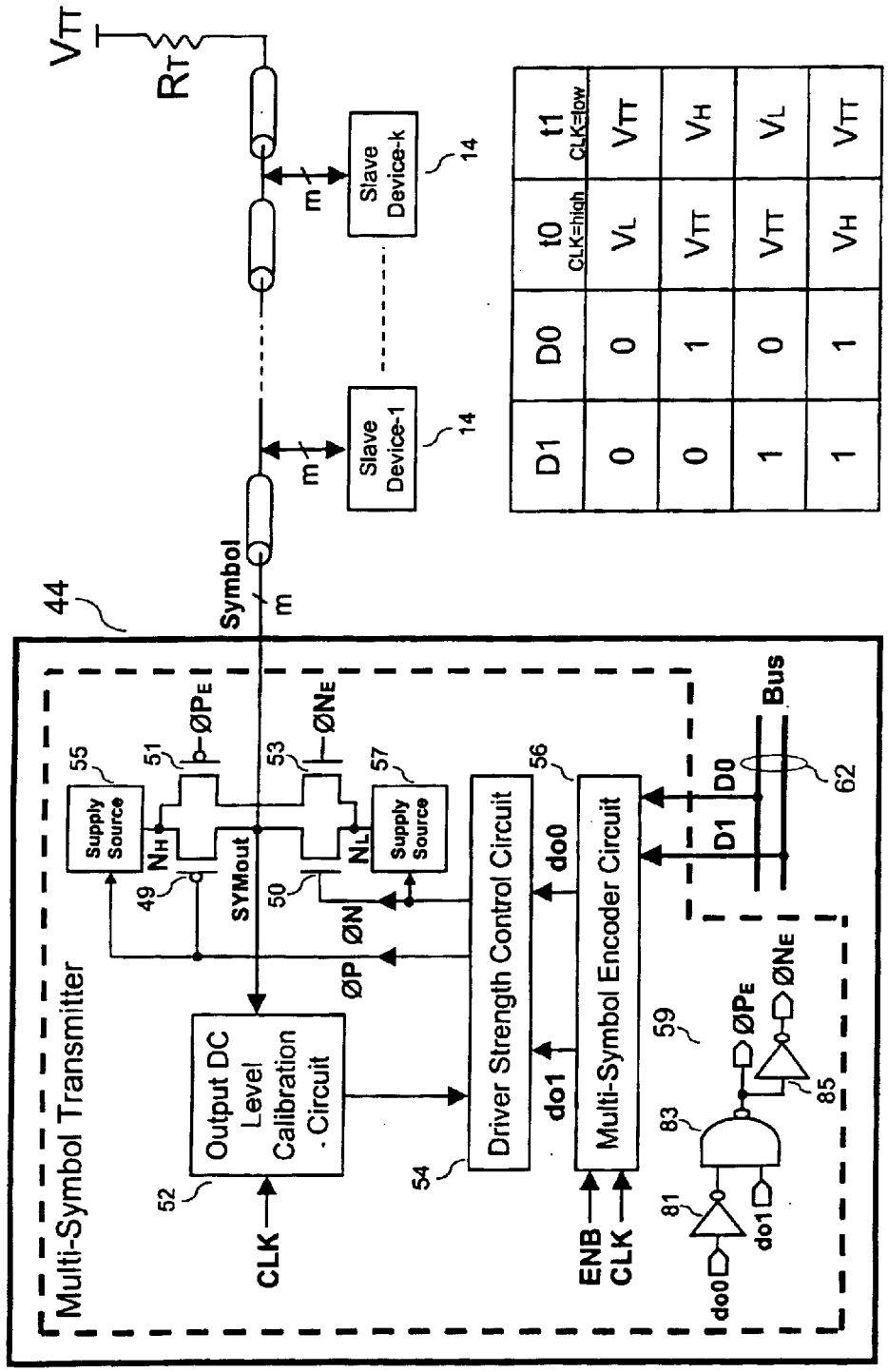
FIG. 6A is a block diagram of one embodiment for a multi-symbol transmitter and a corresponding truth table, in accordance with an embodiment of the present invention.

FIG. 6A is a schematic diagram, in partial block form, of a multi-symbol transmitter 44, according to an embodiment of the present invention. Multi-symbol transmitter 44, which may be a part of a multi-symbol transceiver 34, can be incorporated into an electronic device, such as, for example, a processing device or memory device. This embodiment of multi-symbol transmitter 44 supports or utilizes a single-ended Symbol signal which is output over a respective Symbol line to an appropriate receiver.

Multi-symbol transmitter 44 receives a clock (CLK) signal and an enable (ENB) signal. The clock (CLK) signal may run at twice the frequency of symbol (system) clock. Multi-symbol transmitter 44 operates on one or more streams of data to be output from the electronic device. The data stream (which is synchronized with the clock (CLK) signal) may include a number of data bits, each of which can be a logical value of either "0" (logic-0) or "1" (logic-1). This data may be received by multi-symbol transmitter 44 in input data signals D0, D1 carried on a two-bit wide bus 62 for this embodiment.

As shown, multi-symbol transmitter 44 includes an output DC level calibration circuit 52, a driver strength control circuit 54, a multi-symbol encoder circuit 56, a first supply source 55, a second supply source 57, and a stabilization control circuit 59. These circuits and supply sources cooperate to generate a Symbol transmission signal for transferring data D0 and D1 out of the electronic device (which then would be acting as an originating device). If a serial-to-parallel conversion stage is added in between the bus 62 and multi-symbol encoder circuit 56, then the data bits on bus 62 can be in serial format instead of parallel format.

Multi-symbol encoder circuit 56 encodes incoming data D1 and D0 (appearing on bus 62) according to an embodiment of the multi-symbol signaling technique described herein. More specifically, for each set of bits D0 and D1 on bus 62, multi-symbol encoder circuit 56 generates a respective symbol 32 (e.g., symbol-00, symbol-01, symbol-10, and symbol-11). Each symbol is uniquely defined by a particular combination of signal level transition and signal region in the carrier Symbol signal. Alternatively, as previously described, each symbol may be alternatively defined by signal levels (e.g., $V_L$, $V_{TT}$, and $V_H$) occurring at respective halves (e.g., time periods t0 and t1) of a clock signal. In one embodiment, multi-symbol encoder circuit 56 encodes the incoming data D1 and D0 according to the table shown on FIG. 7. Multi-symbol encoder circuit 56 outputs output data signals do0 and do1. Multi-symbol encoder circuit 56 receives as input signals D0, D1, CLK, and ENB. When the ENB signal is low, multi-symbol transmitter 44 is enabled so that a symbol transfer cycle may begin.

Driver strength control circuit 54, coupled to multi-symbol encoder circuit 56, receives the do0 and do1 signals therefrom. Driver strength control circuit 54 also receives a signal from output DC level calibration circuit 52. Driver strength control circuit 54 generates a pair of control signals ØP and ØN. Control signal ØP has the same logic polarity as output data signal do1. Control signal ØN has the same logic polarity as output data signal do0. In general, driver strength control circuit 54 functions to regulate or control the signal levels (e.g., $V_L$ and $V_H$) of the Symbol signal for transmitting the symbols via a suitable channel. To accomplish this, driver strength control circuit 54 may control a suitable driver circuit (as described below).

Stabilization control circuit 59 is also coupled to multi-symbol encoder circuit 56, and receives the do0 and do1 signals therefrom. Stabilization control circuit 59 comprises an inverter 81, a NAND gate 83, and an inverter 85. Inverter 81 receives the do0 signal. NAND gate 83 receives the output signal of inverter 81 at one input and the do1 signal at another input. NAND gate 83 outputs a control signal ØP$_E$. Inverter 85 receives the output signal of NAND gate 83 and outputs a control signal ØN$_E$. Control signals ØP$_E$ and ØN$_E$ generally serve to control circuitry which is used to stabilize particular nodes in the driver circuit of multi-symbol transmitter 44.

An exemplary driver circuit may be implemented as a driver circuit comprising a first transistor 49, a second transistor 50, first supply source 55, and second supply source 57. As depicted, transistor 49 comprises a PMOS transistor and transistor 50 comprises an NMOS transistor. Transistors 49 and 50 are coupled together at their drains. The source of transistor 49 is coupled to the first supply source 55 at a node $N_H$, and the source of the transistor 50 is coupled to the second supply source 57 at a node $N_L$. The gates of transistor 49 and transistor 50 receive the ØP and ØN signals, respectively. As such, the ØP and ØN signals serve as control signals for transistor 49 and transistor 50.

A pair of transistors 51 and 53 are also coupled between supply sources 55 and 57. As depicted, transistor 51 comprises a PMOS transistor and transistor 53 comprises an NMOS transistor. Transistors 49 and 50 are coupled together at their drains. The source of transistor 51 is coupled to supply source 55, and the source of the transistor 53 is coupled to supply source 57. The gate of transistor 51 receives control signal ØP$_E$ and the gate of transistor 53 receives control signal ØN$_E$. In general, these transistors 51 and 53 serve to stabilize the voltages at nodes $N_H$ and $N_L$.

In one embodiment, each of supply sources 55 and 57 can be constant current sources. In this case, transistors 49 and 50 act as "switching transistors." Transistors 49 and 51 may have the same size; transistors 50 and 53 may have the same size. Transistors 49 and 50 form the push-pull switching transistors for the multi-symbol transmitter 44.

When control signal ØP is low (GND), transistor 49 is turned on to connect the Symbol bus to supply source 55, thereby driving the Symbol bus to $V_H$ level; when control signal ØP is high (Vcc), transistor 49 is turned off. When control signal ØN is high, transistor 50 is turned on to connect the Symbol bus to supply source 57, thereby driving the Symbol bus to $V_L$ level; when control signal ØN is low, transistor 50 is turned off.

When control signal ØN is low and control signal ØP is high, the push-pull switching transistors 49 and 50 are turned off and both supply source 55 and supply source 57 are disconnected from the Symbol bus. At this moment, the predetermined voltage (e.g., termination voltage $V_{TT}$) will pull the Symbol bus to $V_{TT}$ level through termination resistor $R_T$. Supply source stabilizing transistors 51 and 53 are turned on to maintain roughly the same voltage levels at nodes $N_H$ (e.g., Vsat$_H$) and $N_L$ (e.g., Vsat$_L$), respectively, as with a previous operation for transmitting a symbol (i.e., either supply source 55 driving the bus to $V_H$ through transistor 49, or supply source 57 driving the bus to $V_L$ through transistor 50). This ensures signal integrity for the next symbol because both nodes $N_H$ and $N_L$ start at roughly the same voltage levels for each transfer operation.

Transistors 51 and 53 are controlled by signals ØP$_E$ and ØN$_E$, respectively. These control signals ØP$_E$ and ØN$_E$ are generated by stabilization control circuit 59, which receives do0 and do1 as input signals. When the do0 signal is logic-0 and the do1 signal is logic-1 (in which case both transistors 49 and 50 are turned off), control signal ØP$_E$ is logic-0 and control signal ØN$_E$ is logic-1. This turns on transistors 51 and 53, thus forming a current path between nodes $N_H$ and $N_L$ to maintain both nodes roughly at Vsat$_H$ and Vsat$_L$, respectively.

At power up, output DC level calibration circuit 52 automatically generates test data patterns to determine proper magnitudes of current at supply source 55 and supply source 57, and proper sizes of transistors 49, 51, 50, and 53 to ensure proper DC levels of $V_H$ and $V_L$ for a given channel (i.e., Symbol bus). Transistors 49, 51, 50, and 53 may actually comprise multiple programmable transistors with the same drive strengths to give incremental DC level adjustments on the $V_H$ and $V_L$. Output DC level calibration circuit 52 registers information on the selected sizes of supply source 55 and supply source 57, and the transistor size information of transistors 49, 51, 50, and 53 in a register (not shown) contained in driver strength control circuit 54.

In operation, when the enable (ENB) signal is low, multi-symbol transmitter 44 is enabled to begin a symbol transfer cycle. During the symbol transfer cycle, multi-symbol transmitter 44 drives the Symbol bus through the push-pull driver circuit. Driver strength control circuit 54 utilizes the information contained in its size register, in combination with the do0 and do1 signals from multi-symbol encoder circuit 56, to determine the suitable strengths for the constant current sources implementing supply sources 55 and 57, and the number of transistors 49 and 50 to be used to drive the Symbol bus. The strength control is achieved by using multiples of each of control signals ØP and ØN (only shown as single signals in FIG. 6A). Control signal ØP controls transistor 49 and supply source 55, and control signal ØN controls transistor 50 supply source 57.

In the symbol transfer cycle, multi-symbol transmitter 44 drives the Symbol bus. At the other end of the Symbol bus, termination resistor $R_T$ and termination voltage $V_{TT}$ minimize the reflection caused by the transmission line effect of the channel, thus ensuring proper signal integrity for the receivers of any device (e.g., slave device-1 to slave device-k) to read the transmitted symbols properly.

Figure 7:
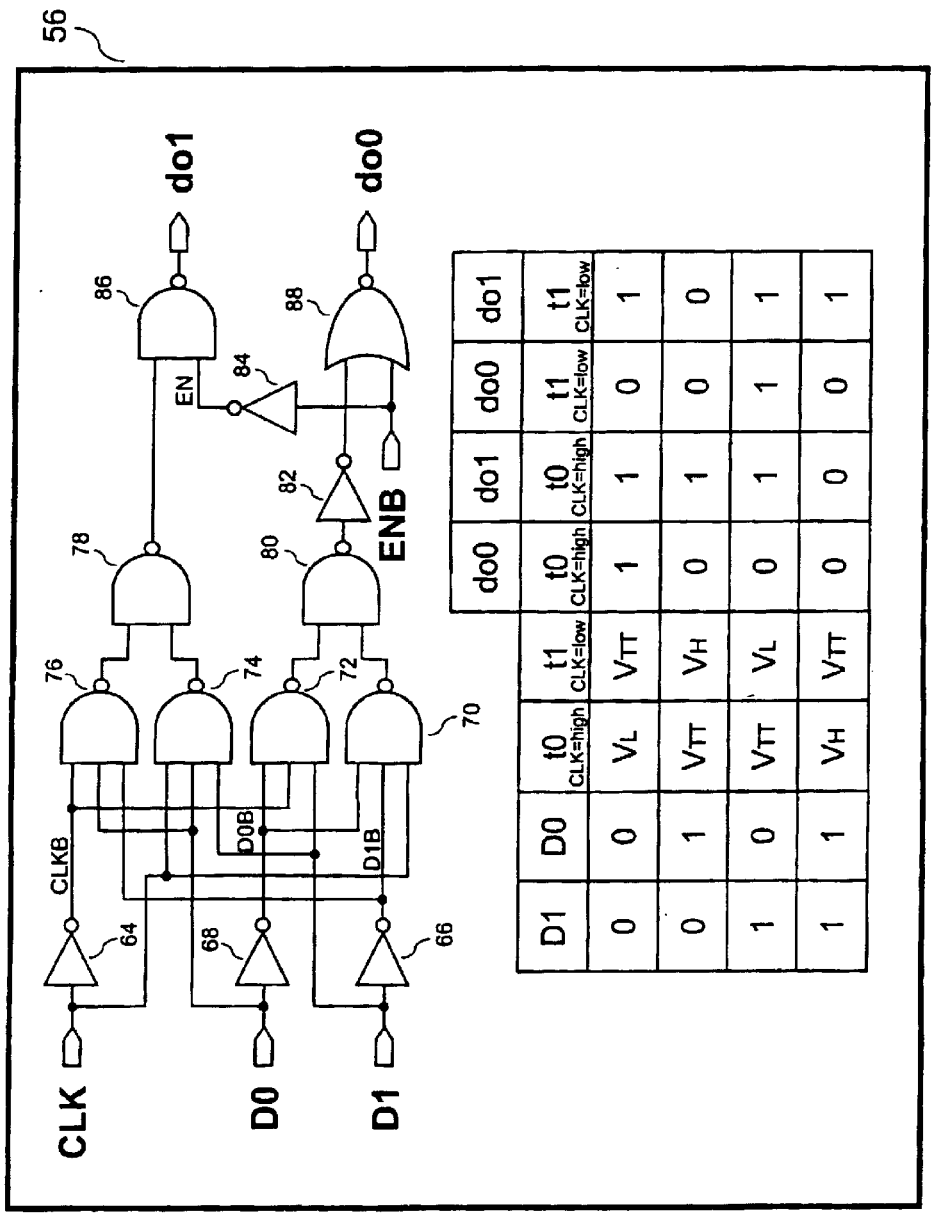
FIG. 7 is a logic diagram of a multi-symbol encoder and a corresponding truth table, in accordance with an embodiment of the present invention.
Figure 8:
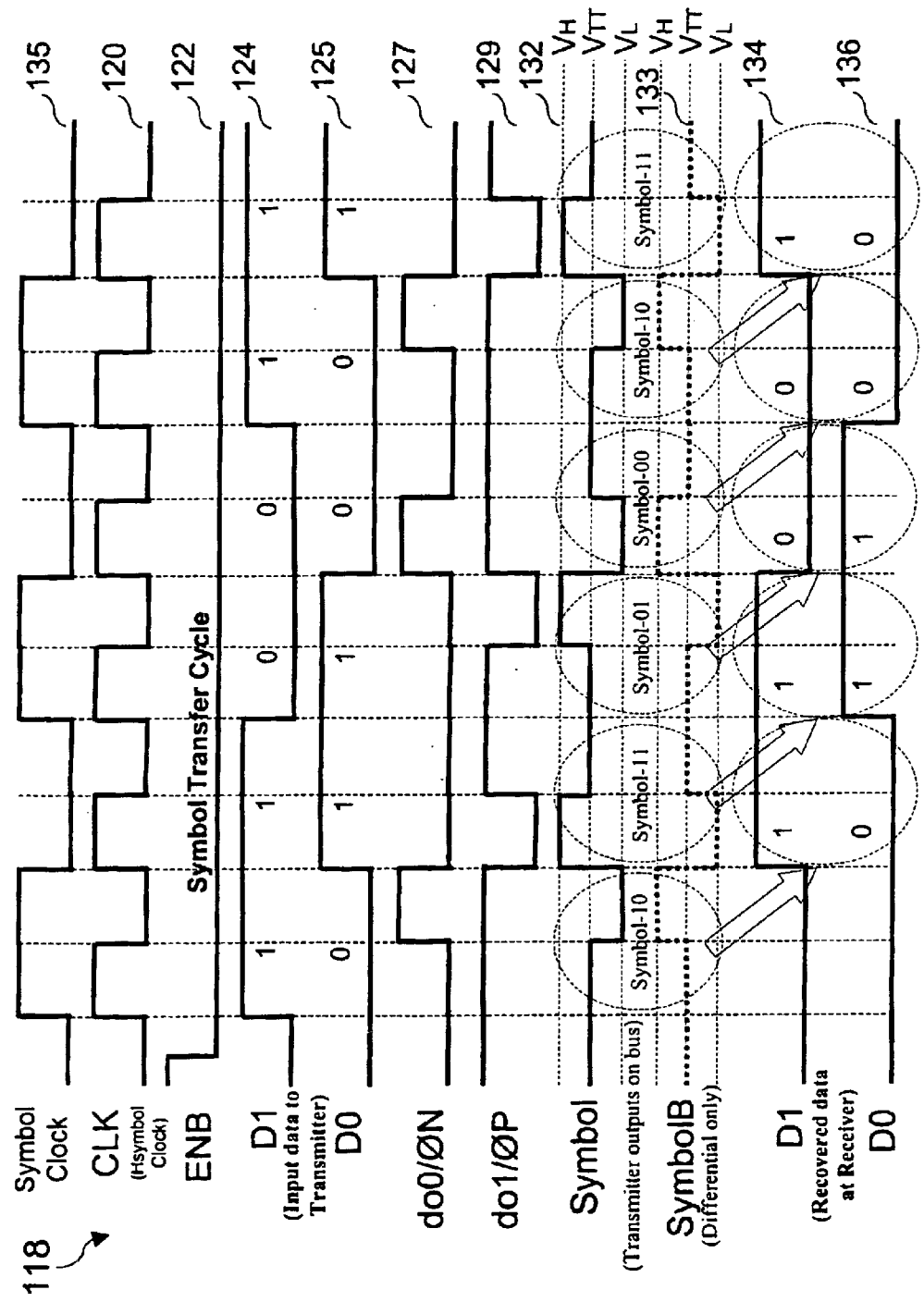
FIG. 8 is a timing diagram corresponding to the multi-symbol encoder of FIG. 7.

In the case of D1=0 and D0=0, at a time period to (during CLK high time), do0=ØN has a value of logic-1 and do1=ØP has a value of logic-1 (see FIGS. 7 and 8). Transistor 50 will be turned on and transistor 49 will be turned off, thus setting the signal level on the Symbol bus voltage to $V_L$ level during CLK high time. At a time period t1 (during CLK low time), do0=ØN has a value of logic-0 and do1=ØP has a value of logic-1 (see FIGS. 7 and 8). Transistors 50 and 49 will be turned off, thus setting the signal level on the Symbol bus to $V_{TT}$ level during CLK low time. Transistors 51 and 53 both turn on to form a current path between nodes $N_H$ and $N_L$ to maintain both nodes roughly at $Vsat_H$ and $Vsat_L$, respectively.

In the case of D1=0 and D0=1, at a time period to (during CLK high time), do0=ØN has a value of logic-0 and do1=ØP has a value of logic-1 (see FIGS. 7 and 8). Transistors 50 and 49 will both be turned off, thus setting the signal level on the Symbol bus to $V_{TT}$ during CLK high time. Transistors 51 and 53 are both turned on, thus forming a current path between nodes $N_H$ and $N_L$ to maintain both nodes roughly at $Vsat_H$ and $Vsat_L$, respectively. At a time period t1 (during CLK low time), do0=ØN has a value of logic-0 and do1=ØP has a value of logic-0 (see FIGS. 7 and 8). Transistor 50 will be turned off and transistor 49 will be turned on, thus setting the signal level on the Symbol bus to $V_H$ during CLK low time.

In the case of D1=1 and D0=0, at a time period to (during CLK high time), do0=ØN has a value of logic-0 and do1=ØP has a value of logic-1 (see FIGS. 7 and 8). Transistors 50 and 49 will both be turned off, thus setting the signal level on the Symbol bus to $V_{TT}$. Transistors 51 and 53 are both turned on to form a current path between nodes $N_H$ and $N_L$ to maintain both nodes roughly at $Vsat_H$ and $Vsat_L$, respectively. At a time period t1 (during CLK low time), do0=ØN has a value of logic-1 and do1=ØP has a value of logic-1 (see FIGS. 7 and 8). Transistor 50 will be turned on and transistor 49 will be turned off, thus setting the signal level on the Symbol bus to $V_L$.

In the case of D1=1 and D0=1, at a time period to (during CLK high time), do0=ØN has a value of logic-0 and do1=ØP has a value of logic-0 (see FIGS. 7 and 8). Transistor 50 will be turned off and transistor 49 will be turned on, thus setting the signal level on the Symbol bus to $V_H$. At a time period t1 (during CLK low time), do0=ØN has a value of logic-0 and do1=ØP has a value of logic-1 (see FIGS. 7 and 8). Transistors 50 and 49 will both be turned off, thus setting the signal level on the Symbol bus to $V_{TT}$. Transistors 51 and 53 are both turned on, thus forming a current path between nodes $N_H$ and $N_L$ to maintain both nodes roughly at $Vsat_H$ and $Vsat_L$, respectively.

In an alternate embodiment which supports or utilizes a single-ended Symbol signal, supply source 55 can be voltage source Vcc and supply source 57 can be ground (GND). In such case, at power up, output DC level calibration circuit 52 automatically generates test data patterns to determine the proper sizes of transistors 49 and 50 to ensure proper DC levels of $V_H$ and $V_L$ for a given channel (i.e., the Symbol bus). Transistors 49 and 50 can be driver transistors. Transistors 49 and 50 may actually comprise multiple programmable transistors with the different drive strengths to give incremental DC level adjustments on the $V_H$ and $V_L$. Output DC level calibration circuit 52 registers information on sizes of transistors 49 and 50 in a register (not shown) contained in driver strength control circuit 54. In this case, because node $N_H$ is connected to Vcc and node $N_L$ is connected to ground, transistors 51 and 53 are not needed to stabilize the voltages at these two nodes between different operations (i.e., either for actively driving symbol bus to $V_H$ or $V_L$, or allowing the predetermined voltage (e.g., termination voltage $V_{TT}$) to determine the bus voltage).

During the symbol transfer cycle, driver strength control circuit 54 utilizes the information contained in its size register, in combination with the do0 and do1 signals from the multi-symbol encoder circuit 56, to determine the number of transistors 49 and 50 for the push-pull driver to be used to drive the Symbol bus.

In yet an alternate embodiment which supports or utilizes a single-ended Symbol signal, supply source 55 can be a constant voltage source VC1 and supply source 57 can be a constant voltage source VS1. At power up, output DC level calibration circuit 52 automatically generates test data patterns to determine the proper sizes for transistors 49 and 50 to ensure proper DC levels of $V_H$ and $V_L$ for a given channel (i.e., the Symbol bus). Transistors 49 and 50 can be driver transistors. Transistors 49 and 50 may actually comprise multiple programmable transistors with the different drive strengths to give incremental DC level adjustments on the $V_H$ and $V_L$. Output DC level calibration circuit 52 registers the information regarding the sizes of transistors 49 and 50 in the size register contained in driver strength control circuit 54. In this case, because node $N_H$ is connected to constant voltage source VC1 and node $N_L$ is connected to constant voltage source VS1, transistors 51 and 53 are not needed to stabilize the voltages at these two nodes between different operations (i.e., either for actively driving symbol bus to $V_H$ or $V_L$, or allowing the predetermined voltage (e.g., termination voltage $V_{TT}$) to determine the bus voltage).

During the symbol transfer cycle, driver strength control circuit 54 utilizes the information contained in its size register, in combination with the do0 and do1 signals from the multi-symbol encoder circuit 56, to determine the number of transistors 49 and 50 for the push-pull driver to be used to drive the Symbol bus.

Figure 6B:
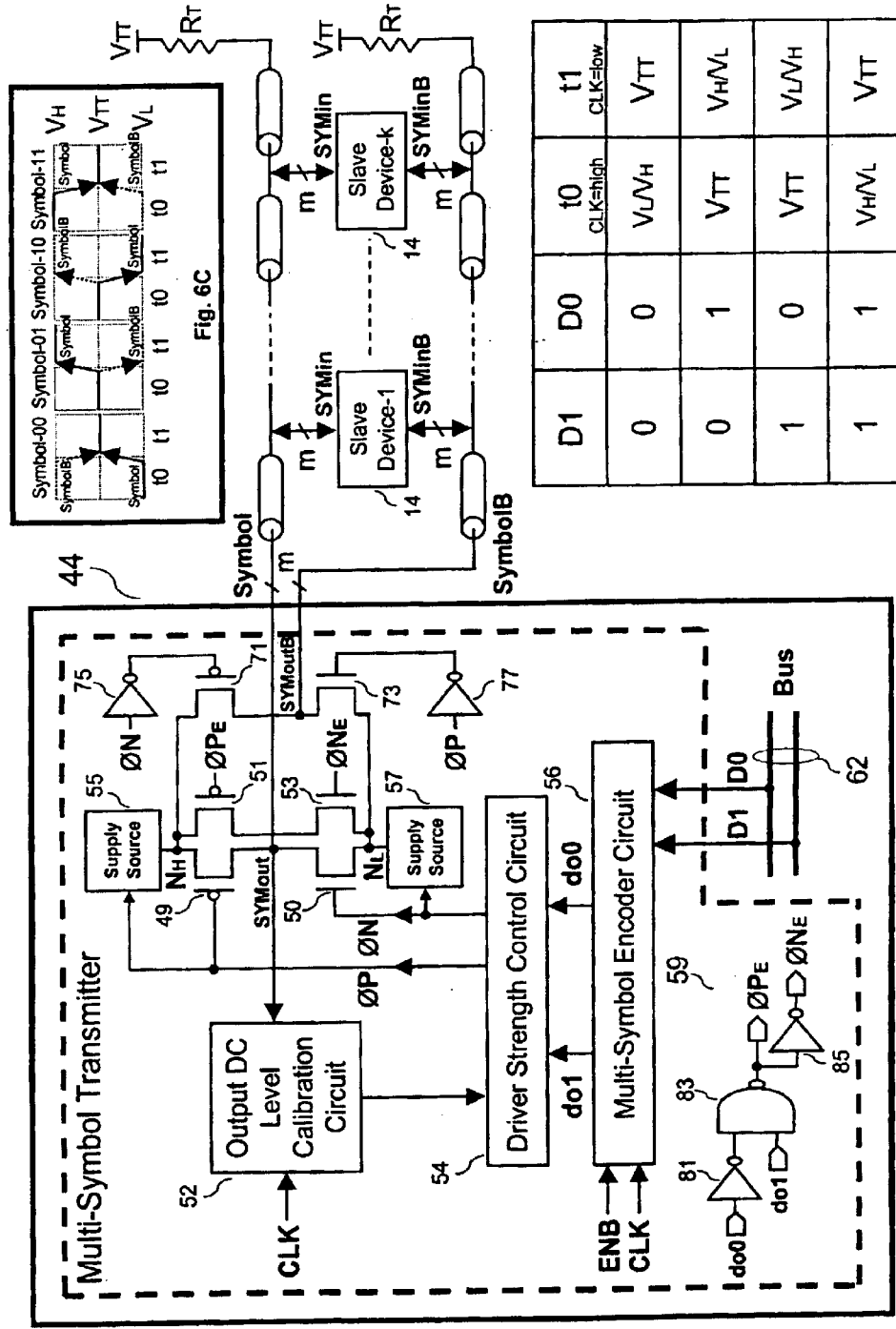
FIG. 6B is a block diagram of another embodiment for a multi-symbol transmitter and a corresponding truth table, in accordance with an embodiment of the present invention.

FIG. 6B is a schematic diagram, in partial block form, of an alternate embodiment for multi-symbol transmitter 44. This embodiment of multi-symbol transmitter 44 supports or utilizes a Symbol signal and differential SymbolB signal, which are carried over a Symbol line and SymbolB line, respectively.

Similar to the embodiment shown in FIG. 6A, this embodiment of multi-symbol transmitter 44 shown in FIG. 6B includes an output DC level calibration circuit 52, a driver strength control circuit 54, a multi-symbol encoder circuit 56, a first supply source 55, a second supply source 57, and a stabilization control circuit 59. These circuits 52, 54, 56, and 59 and power sources 55 and 57 operate essentially the same as previously described with reference to FIG. 6A. This embodiment of multi-symbol transmitter 44 also includes an exemplary driver circuit (comprising transistors 49 and 50 coupled between supply sources 55 and 57), and stabilizing transistors 51 and 53.

Multi-symbol transmitter 44 also includes a pair of transistors 71 and 73 (coupled between supply sources 55 and 57) and inverters 75 and 77. Inverter 75 receives the control signal ØN at its input, and inverter 77 receives the control signal ØP at its input. Transistor 71 may comprise a PMOS transistor, and transistor 73 may comprise an NMOS transistor. Transistors 71 and 73 are coupled together at their drains. The source of transistor 71 is coupled to supply source 55, and the source of the transistor 73 is coupled to supply source 57. The gate of transistor 71 receives the output signal from inverter 75, and the gate of transistor 73 receives the output signal from inverter 77. In general, transistors 71 and 73 and inverters 75 and 77 cooperate to support the generation and driving of the differential signal SymbolB, which is output as signal SYMoutB at the junction of transistors 71 and 73. Transistors 71 and 73, in combination with supply sources 55 and 57, may constitute a differential output driver circuit.

In one embodiment of multi-symbol transmitter 44 which supports or utilizes a Symbol signal and differential SymbolB signal, each of supply sources 55 and 57 can be constant current sources. Transistors 49, 73 and 71, 50 form the differential push-pull switching transistors for multi-symbol transmitter 44. Transistors 49, 51, and 71 may have the same size; transistors 50, 53, and 73 may have the same size.

When control signal ØP is low (GND), transistor 49 is turned on to connect the Symbol bus to supply source 55, thereby driving the Symbol bus to $V_H$ level; transistor 73 is also turned on to connect supply source 57 to drive the SymbolB bus to $V_L$ level. When control signal ØP is high (Vcc), transistors 49 and 73 are turned off. When control signal ØN is high, transistors 50 and 71 are turned on to connect the Symbol and SymbolB buses to supply sources 57 and 55, respectively. Thus, the Symbol bus is driven to $V_L$ level, and the SymbolB bus is driven to $V_H$ level. When control signal ØN is low, the transistors 50 and 71 are turned off.

When control signal ØN is low and control signal ØP is high, push-pull switching transistors 49, 50, 71, 73 are turned off and both supply source 55 and supply source 57 are disconnected from the Symbol bus and SymbolB bus. At this moment, the predetermined voltage (e.g., termination voltage $V_{TT}$) will pull both the Symbol bus and SymbolB bus to $V_{TT}$ level through termination resistors $R_T$. Supply source stabilizing transistors 51 and 53 are turned on to maintain roughly the same voltage levels at nodes $N_H$ (e.g., $Vsat_H$) and $N_L$ (e.g., $Vsat_L$), respectively, as with a previous operation for transmitting a symbol. This ensures signal integrity for the next symbol because both nodes $N_H$ and $N_L$ start at roughly the same voltage levels for each transfer operation.

Transistors 51 and 53 are controlled by signals $ØP_E$ and $ØN_E$, respectively. These control signals $ØP_E$ and $ØN_E$ are generated by stabilization control circuit 59, which receives do0 and do1 as input signals. When the do0 signal is logic-0 (in which case transistors 50 and 71 are turned off) and the do1 signal is logic-1 (in which case transistors 49 and 73 are turned off), control signal $ØP_E$ is logic-0 and control signal $ØN_E$ is logic-1. This turns on transistors 51 and 53, thus forming a current path between nodes $N_H$ and $N_L$ to maintain both nodes roughly at $Vsat_H$ and $Vsat_L$, respectively.

At power up, output DC level calibration circuit 52 automatically generates test data patterns to determine proper magnitudes of current at supply source 55 and supply source 57, and proper sizes of transistors 49, 50, 51, 53, 71, and 73 to ensure proper DC levels of $V_H$ and $V_L$ for given channel (i.e., Symbol bus and SymbolB bus). Transistors 49, 50, 51, 53, 71, and 73 may actually comprise multiple programmable transistors with the same drive strengths to provide incremental DC level adjustments on the $V_H$ and $V_L$. Output DC level calibration circuit 52 registers information on the selected sizes of supply source 55 and supply source 57, and the transistor size information of transistors 49, 50, 51, 53, 71, and 73 in a register (not shown) contained in driver strength control circuit 54.

In operation, when the enable (ENB) signal is low, multi-symbol transmitter 44 is enabled to begin a symbol transfer cycle. During the symbol transfer cycle, multi-symbol transmitter 44 drives the Symbol and SymbolB buses through the push-pull driver circuits (comprising supply sources 55 and 57 in combination with transistors 49 and 50 for the Symbol bus and transistors 71 and 73 for the SymbolB bus). Driver strength control circuit 54 utilizes the information contained in its size register, in combination with the do0 and do1 signals from multi-symbol encoder circuit 56, to determine the suitable strengths for the constant current sources implementing supply sources 55 and 57, and the number of transistors 49, 50, 51, 53, 71, and 73 to be used to drive the Symbol and SymbolB buses. The strength control is achieved by using multiples of each of control signals ØP and ØN (only shown as single signals in FIG. 6B). Control signal ØP controls transistors 49 and 73 and supply source 55, and control signal ØN controls transistors 50 and 71 and supply source 57.

Multi-symbol encoder circuit 56 encodes incoming data D1 and D0 (appearing on bus 62) according to an embodiment of the multi-symbol signaling technique described herein. Multi-symbol encoder circuit 56 receives as input signals D0, D1, CLK, and ENB. When the ENB signal is low, the differential multi-symbol transmitter 44 is enabled, and the symbol transfer cycle may begin. Multi-symbol transmitter 44 will drive the Symbol bus and SymbolB bus to transmit "differential" symbols according to the waveforms illustrated in FIG. 6C for four different symbols. The other end of the Symbol bus or SymbolB bus is terminated with a termination resistor $R_T$ and a predetermined voltage (e.g., termination voltage $V_{TT}$) to minimize the reflection caused by the transmission line effect of the channel. This ensures signal integrity for the receivers of any slave devices to read the transmitted "differential" symbols properly.

In the case of D1=0 and D0=0, at a time period t0 (during CLK high time) do0=ØN has a value of logic-1 and do1=ØP has a value of logic-1 (see FIGS. 7 and 8). Transistors 50 and 71 will be turned on and transistors 49 and 73 will be turned off, thus setting the signal level on Symbol bus voltage to $V_L$ and the signal level on SymbolB bus to $V_H$ during CLK high time. At a time period t1 (during CLK low time), do0=ØN has a value of logic-0 and do1=ØP has a value of logic-1 (see FIGS. 7 and 8). Each of transistors 49, 50, 71, 73 will be turned off, thus setting the signal levels of the Symbol bus and SymbolB bus to $V_{TT}$ during CLK low time. Transistors 51 and 53 are both turned on, thus forming a current path between nodes $N_H$ and $N_L$ to maintain both nodes roughly at $Vsat_H$ and $Vsat_L$, respectively.

In the case of D1=0 and D0=1, at a time period t0 (during CLK high time), do0=ØN has a value of logic-0 and do1=ØP has a value of logic-1 (see FIGS. 7 and 8). Transistors 49, 50, 71, 73 will all be turned off, thus setting the signal level on both the Symbol bus and SymbolB bus to $V_{TT}$ during CLK high time. Transistors 51 and 53 are both turned on, thus forming a current path between nodes $N_H$ and $N_L$ to maintain both nodes roughly at $Vsat_H$ and $Vsat_L$, respectively. At a time period t1 (during CLK low time), do0=ØN has a value of logic-0 and do1=ØP has a value of logic-0 (see FIGS. 7 and 8). Transistors 50 and 71 will be turned off and transistors 49 and 73 will be turned on, thus setting the signal level on the Symbol bus voltage to $V_H$ and the signal level on the SymbolB bus to $V_L$ during CLK low time.

In the case of D1=1 and D0=0, at a time period t0 (during CLK high time), do0=ØN has a value of logic-0 and do1=ØP has a value of logic-1 (see FIGS. 7 and 8). Transistors 49, 50, 71, and 73 will all be turned off, thus setting the signal level on both the Symbol bus and SymbolB bus to $V_{TT}$ during CLK high time. Transistors 51 and 53 are both turned on, thus forming a current path between nodes $N_H$ and $N_L$ to maintain both nodes roughly at $Vsat_H$ and $Vsat_L$, respectively. At a time period t1 (during CLK low time), do0=ØN has a value of logic-1 and do1=ØP has a value of logic-1 (see FIGS. 7 and 8). Transistors 50 and 71 will be turned on and transistors 49 and 73 will be turned off, thus setting the signal level on the Symbol bus to $V_L$ and the signal level on the SymbolB bus to $V_H$ during CLK low time.

In the case of D1=1 and D0=1, at a time period t0 (during CLK high time), do0=ØN has a value of logic-0 and do1=ØP has a value of logic-0 (see FIGS. 7 and 8). Transistors 50 and 71 will be turned off and transistors 49 and 73 will be turned on, thus setting the signal level on the Symbol bus voltage to $V_H$ and the signal level on the SymbolB bus to $V_L$ during CLK high time. At a time period ti (during CLK low time), do0=ØN has a value of logic-0 and do1=ØP has a value of logic-1 (see FIGS. 7 and 8). Transistors 49, 50, 71, 73 will all be turned off, thus setting the signal level on both the Symbol bus and the SymbolB bus to $V_{TT}$ during CLK low time. Transistors 51 and 53 are both turned on, thus forming a current path between nodes $N_H$ and $N_L$ to maintain both nodes roughly at $Vsat_H$ and $Vsat_L$, respectively.

In an alternate embodiment of multi-symbol transmitter 44 which supports or utilizes a differential signal, supply source 55 can be voltage source Vcc and supply source 57 can be ground (GND). In yet another alternate embodiment of the differential multi-symbol transmitter 44, supply source 55 can be a constant voltage source VC1 and supply source 57 can be a constant voltage source VS1. These alternate embodiments operate in like manner to the similarly configured embodiments for the single-ended multi-symbol transmitter described above with reference to FIG. 6A.

Multi-Symbol Encoder

FIG. 7 is a logic diagram of a multi-symbol encoder circuit 56, in accordance with an embodiment of the present invention. Multi-symbol encoder circuit 56 receives a clock (CLK) input signal and an enable (ENB) input signal along with the input data bits D0 and D1 and generates encoded output data signals do0 and do1. Accompanying the schematic diagram of multi-symbol encoder circuit 56 is a corresponding truth table that illustrates the output values for the various input and clock values.

Multi-symbol encoder circuit 56 comprises a plurality of inverters 64, 66, 68, 82, and 84, a plurality of NAND gates 70, 72, 74, 76, 78, 80, and 86, and a NOR gate 88. NAND gates 70, 72, and 80, and inverter 82, along with NOR gate 88 provide the encoding logic for output data signal do0. NAND gates 74, 76, 78, and 86 provide the encoding logic for output data signal do1. In operation, NAND gates 70 and 74 receive the CLK signal, while NAND gates 72 and 76 receive the inverted CLK signal (CLKB) provided by inverter 64. NAND gates 74 and 76 receive the signal for data bit D0, while NAND gates 70 and 72 receive the signal for inverted data bit D0 (D0B) provided by inverter 68. NAND gates 72 and 74 receive the signal for data bit D1, while NAND gates 70 and 76 receive the signal for inverted data bit D1 (D1B) provided by inverter 66. NAND gate 78 receives the output signals from NAND gates 74 and 76 and provides an output signal to NAND gate 86. NAND gate 80 receives the output signals from NAND gates 70 and 72 and provides an output signal to inverter 82, whose output signal goes to NOR gate 88. NAND gate 86 receives the output signal from NAND gate 78 and an inverted ENB signal (EN), provided by inverter 84, and outputs data signal do1. NOR gate 88 receives the output signal from inverter 82 and the ENB signal and outputs data signal do0. When the ENB input signal goes to a low voltage level or a logic-0 value, multi-symbol encoder circuit 56 is enabled to encode the incoming data bits D0 and D1 to generate proper do0 and do1 logic. This is illustrated in the truth table of FIG. 7 during the time periods t0 and t1 when the CLK signal is at a high logic level and low logic level, respectively.

As an example of the circuit operation for data bits D1=1 and D0=0, when the CLK signal is high, NAND gate 76 receives the signal for data bit D0, the inverted CLK signal, and the inverted signal for data bit D1 and outputs a high voltage or a logic-1 value. NAND gate 74 receives the signal for data bit D0, the CLK signal, and the signal for data bit D1 and outputs a logic-1 value. NAND gate 78 receives a logic-1 value from NAND gates 74 and 76 and outputs a low voltage level or a logic-0 value. NAND gate 86 receives the logic-0 value from NAND gate 78 and, if the ENB signal is low, outputs a logic-1 value, which is shown in the truth table of FIG. 7 for do1 at time period t0 with CLK signal high.

NAND gate 72 receives the signal for data bit D1, the inverted CLK signal, and the inverted signal for data bit D0 and outputs a logic-1 value. NAND gate 70 receives the CLK signal and inverted signals for data bits D0 and D1 and outputs a logic-1 value. NAND gate 80 receives the logic-1 value outputs from NAND gates 70 and 72 and outputs a logic-0 value, which is inverted by inverter 82 to output a logic-1 value. NOR gate 88 receives the logic-1 value from inverter 82 and, if ENB signal is low, outputs a logic-0 value, which is shown in the truth table of FIG. 7 for do0 at time period t0 with CLK signal high. A similar analysis would be understood for the remaining values in the truth table.

Timing Diagram For Multi-Symbol Encoder

FIG. 8 is a timing diagram 118 corresponding to the multi-symbol encoder of FIG. 7. In accordance with an embodiment of the present invention, timing diagram 118 illustrates the timing for a multi-symbol encoder circuit 56 that receives input signals for data bits D0 and D1, along with a clock (CLK) signal and an enable (ENB) signal, and generates encoded output data signals do0 and do1.

Timing diagram 118 includes exemplary waveforms for various signals including symbol clock signal 135, CLK signal 120, ENB signal 122, data: bit signals D1 124 and D0 125, output data signals do0 127 and do1 129, transmitted Symbol signal 132, transmitted differential symbolB signal 133, and the original data bit signals D1 134 and D0 136 recovered at a receiver (e.g., multi-symbol receiver 48). These waveforms illustrated in timing diagram 118 of FIG. 8 are provided to facilitate an understanding of the timing associated with multi-symbol encoder circuit 56 and serve to summarize an exemplary timing for the designated data, as described further herein.

Symbol clock signal 135, which is input into DLL and control timing generator 31, is synchronized with the external system clock signal. CLK signal 120 is derived from the symbol clock signal 135 by DLL and control timing generator 31 and serves as the master clock signal to synchronize, among other things, the transfer and processing of the symbols. ENB signal 122, as described above, initiates the symbol transfer cycle when it drops to a low voltage level or a logic-0 value. The data bit signals 124 and 125 illustrate exemplary data values for data bits D1 and D0 at the input to the multi-symbol transmitter 44 (as discussed in detail with reference to FIGS. 6A and 6B). As an example, the values for data bits D1 and D0 are shown as 10, 11, 01, 00, 10, and 11 for D1 and D0, respectively, over a number of clock cycles. These values are encoded by multi-symbol encoder circuit 56, which outputs data signals do0 127 and do1 129 (as discussed in detail in reference to FIG. 7).

Data signals do0 127 and do1 129, which correspond to control signals ØN and ØP as described above with reference to FIGS. 6A and 6B, are used to generate the symbols in Symbol signal 132, transmitted on the Symbol bus or communication channel. Each symbol may appear as a respective waveform in Symbol signal 132. As depicted, these symbols include, in sequence, symbol-10, symbol-11, symbol-01, symbol-00, symbol-10, and symbol-11. Differential symbolb signal 133 provides a differential single for symbol signal 132. The exemplary symbols illustrated for Symbol signal 132 are recognized by a receiver based upon a voltage transition and region relative to a pre-determined voltage level, such as $V_{TT}$, as discussed in detail herein. Symbol signal 132 is received by multi-symbol receiver 46, which generates data bit signals D1 134 and D0 136, to recover data bits D1 and D0, as discussed in detail below. As shown, data bit signals D1 134 and D0 136 correspond to the original data bit signals D1 124 and D0 126, but delayed one or more clock cycles depending upon the length and delays associated with the communication channel.

Multi-Symbol CMS Receiver

Figure 9:
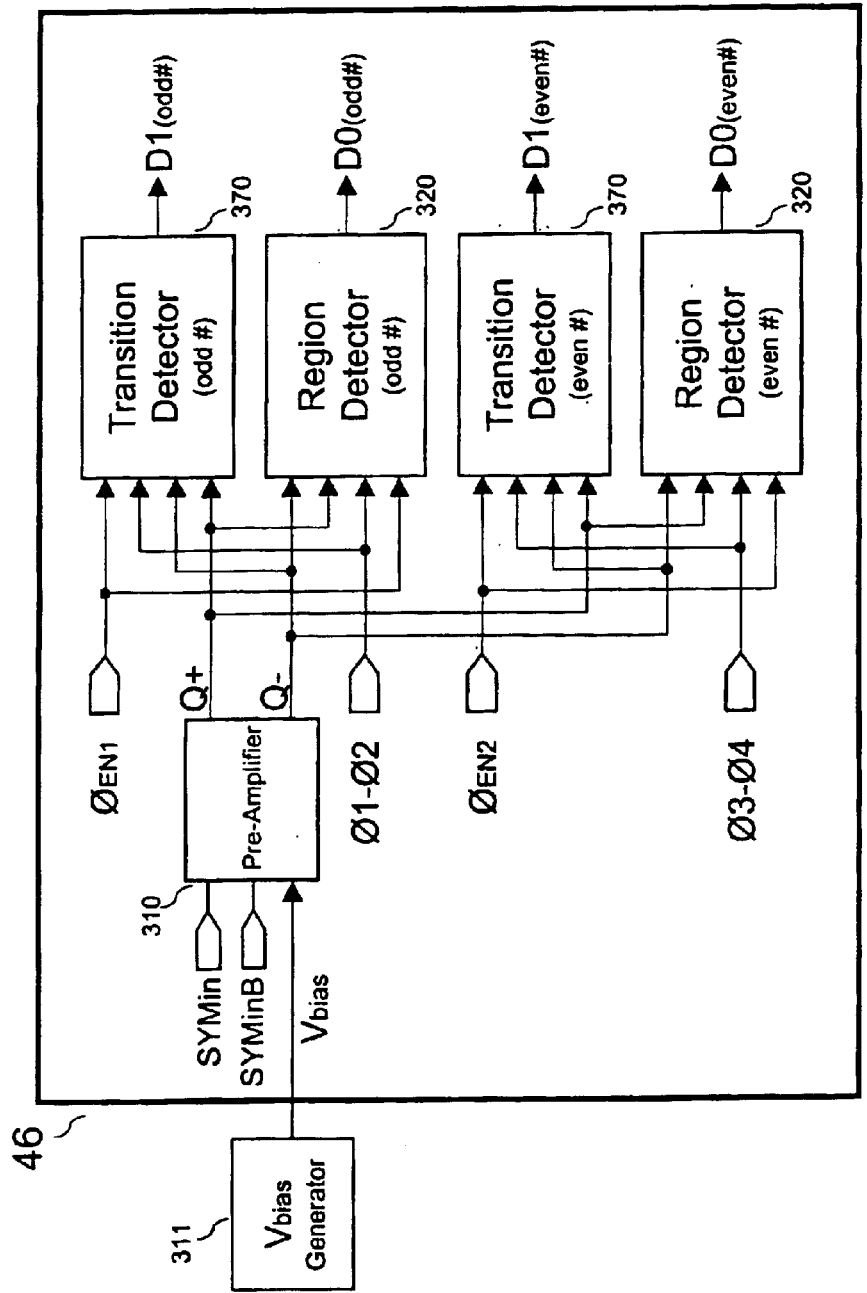
FIG. 9 is a block diagram of a multi-symbol correlated multi-sampling (CMS) receiver, in accordance with an embodiment of the present invention.
Figure 11:
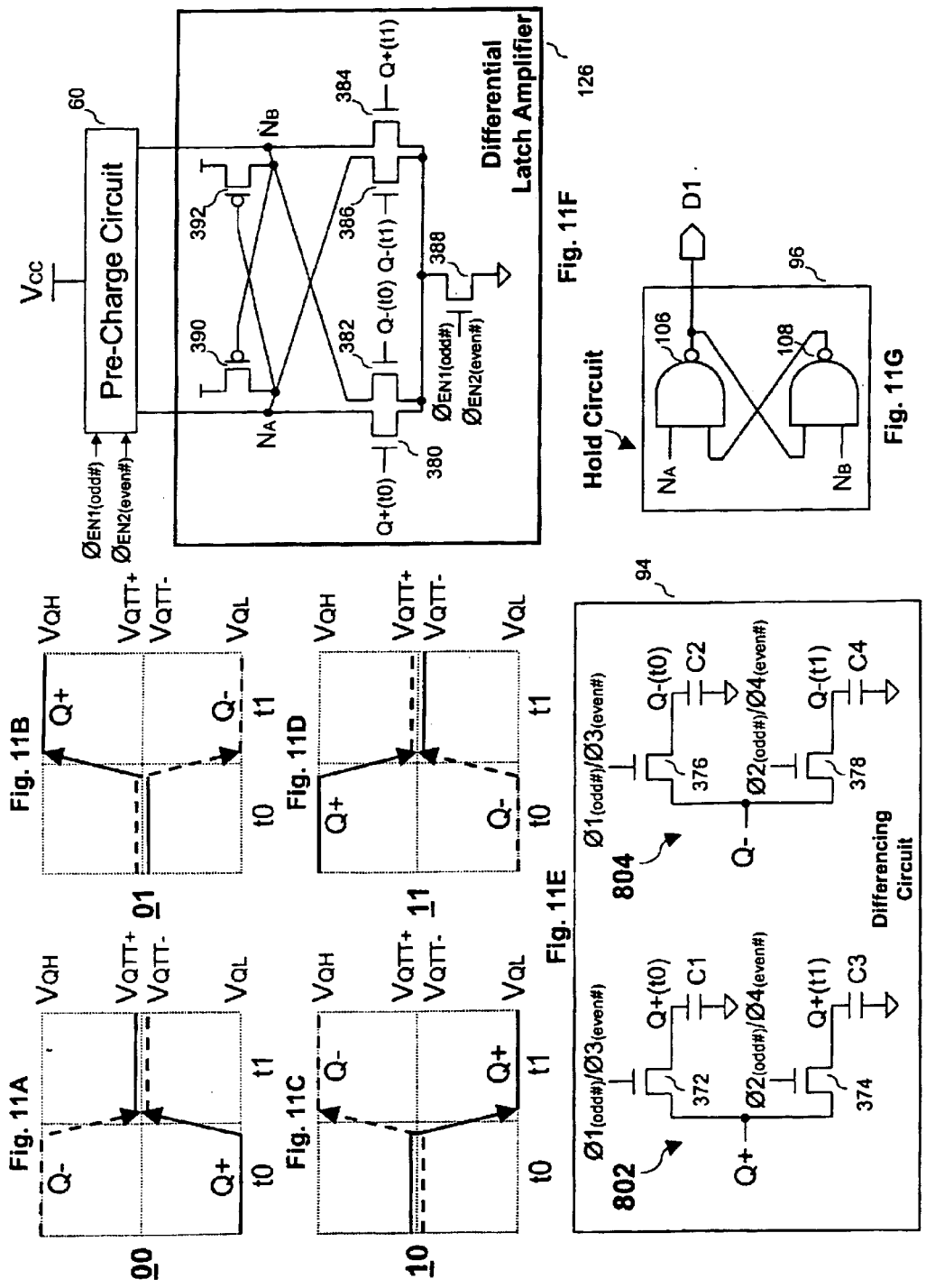
FIGS. 11A–11D are input waveforms showing transition and region for each of a plurality of symbols for transition detection.
FIG. 11E is a schematic diagram of a differencing circuit for use in the transition detector of FIG. 9, in accordance with an embodiment of the present invention.
FIG. 11F is a schematic diagram of a differential latch amplifier with a pre-charge circuit for use in the transition detector of FIG. 9, in accordance with an embodiment of the present invention.
FIG. 11G is a schematic diagram of a hold circuit for use in the transition detector of FIG. 9, in accordance with an embodiment of the present invention.

FIG. 9 is a block diagram of a multi-symbol correlated multi-sampling (CMS) receiver 46 in accordance with an embodiment of the present invention. Multi-symbol CMS receiver 46 comprises a pre-amplifier 310, two region detectors 320, and two transition detectors 370, which provide for the reception of the incoming symbol signals. Pre-amplifier 310 receives the incoming symbol stream and converts the symbols into differential signals (e.g., Q+ and Q−), as described in more detail below. Region detectors 320 and transition detectors 370 translate and decode the incoming differential signals into the correct N-bit data polarity according to a defined truth table. In this exemplary embodiment, N equals 2 and multi-symbol CMS receiver 46 receives the incoming symbols and outputs the two-bit data having the correct polarity according to the truth table defined herein. As shown in FIG. 9 and described in more detail below, this exemplary embodiment provides two region detectors 320 and two transition detectors 370, with one region detector 320 and one transition detector 370 processing the data during odd-numbered clock signals and one region detector 320 and one transition detector 370 processing the data during even-numbered clock signals. This provides interleaved symbol sampling that allows for a high clock and data rate operation.

For an embodiment in which differential signals (Symbol and. SymbolB) are used for transmitting data, pre-amplifier 310 receives input signals SYMin, SYMinB, and voltage Vbias, and provides output signals Q+ and Q−. The input signal SYMin provides the symbols necessary to ultimately derive the values of data bits D0 and D1. The input signal SYMinB is the differential for the signal, while the voltage Vbias is a bias voltage provided by a Vbias generator 311. In an alternate embodiment, in which a single-ended Symbol signal is used for transmitting data, voltage $V_{TT}$ may be provided at one input of pre-amplifier 310 instead of the SYMinB signal. The voltage $V_{TT}$ may provide a termination reference voltage from a tracking channel that indicates the channel characteristics for the Symbol bus. An exemplary embodiment of pre-amplifier 310 is illustrated and described in detail with reference to FIG. 10.

Vbias generator 311, which may provide process, voltage, and temperature (PVT) compensation, generates voltage Vbias. The output signals Q+ and Q− represent the differential symbol information derived from input signal SYMin, with these output signals provided to region detectors 320 and transition detectors 370.

Region detectors 320, with one provided to process the symbols during odd-numbered clock signals and one provided to process the symbol during even-numbered clock signals, receives the signals Q+ and Q− along with the corresponding control or phase signals for odd or even-numbered processing. The phase signals Ø1, Ø2, and $Ø_{EN1}$ correspond to the odd-numbered clock cycles while the phase signals Ø3, Ø4, and $Ø_{EN2}$ correspond to the even-numbered clock cycles. The phase signals Ø1, Ø2, Ø3, Ø4 correspond to one-cycle clock times and are phase-shifted to provide the timing for sampling the incoming symbols. Region detector 320 generally functions to determine the defining signal region within which each symbol for transmitting data lies. To accomplish this, in one embodiment, region detector 320 may sample and average the voltage levels of the incoming symbols so as to detect and amplify the least significant bit (i.e., D0) of the two data bits (i.e., D1 and D0) encoded by the transmitter, discussed above, and output the appropriate data values. An exemplary embodiment of region detector 320 is illustrated and described in detail with reference to FIG. 12.

Transition detector 370, with one provided to process the symbol during odd-numbered clock signals and one provided to process the symbol during even-numbered clock signals, receives the signals Q+ and Q− along with the corresponding phase signals for odd or even-numbered processing. The phase signals Ø1, Ø2, and $Ø_{EN1}$ correspond to the odd-numbered clock cycles while the phase signals Ø3, Ø4, and $Ø_{EN2}$ correspond to the even-numbered clock cycles. The phase signals $Ø_{EN1}$ and $Ø_{EN2}$ will provide a logical high-level signal to activate the corresponding odd or even-numbered transition detector 370 to process the incoming symbols. Transition detector 370 generally functions to determine the defining transition for each symbol for transmitting data. To accomplish this, in one embodiment, transition detector 370 may determine the direction of the transition (positive or negative) of the incoming symbols and recover the most significant bit (i.e., D1) of the two data bits (i.e., D1 and D0) encoded at the transmitter, discussed above, and output the appropriate data values. An exemplary embodiment of transition detector 370 is illustrated and described in detail with reference to FIG. 11.

Pre-Amplifier

FIG. 10 illustrates a schematic diagram of a pre-amplifier 310, in accordance with an embodiment of the present invention. As discussed above, pre-amplifier 310 receives input signal SYMin, differential signal SYMinB (or voltage $V_{TT}$), and voltage Vbias, and provides output signals Q+ and Q−. Accompanying the schematic diagram of pre-amplifier 310 are corresponding illustrations of input and output waveforms. The input waveforms, designated SYMin Waveforms, illustrate exemplary voltage values (i.e., $V_H$, $V_{TT}$, and $V_L$) for transmitted symbols (i.e., symbol-00, symbol-01, symbol-10, and symbol-11) during clock time periods t0 and t1. The SYMin waveforms illustrate waveforms received at input SYMin of pre-amplifier 310. The corresponding output waveforms, designated Q+/Q− waveforms, illustrate exemplary voltage data values that are provided by pre-amplifier 310 at respective output nodes Q+ and Q−. Note that the Q+ values are shown as a solid line and the Q− values are shown as a dashed line. For example, SYMin waveform symbol-10 received by pre-amplifier 310 at input SYMin results in output values at Q+ and Q− as shown in the Q+/Q− waveforms for symbol-10. Specifically, input signal SYMin during time period to is at voltage level $V_{TT}$ and then drops to voltage level $V_L$ for time period t1. These values at input SYMin result in output values for signals Q+ and Q− of voltage levels $V_{QTT+}$ and $V_{QTT-}$, during time period to, and voltage level $V_{QH}$ for signal Q− and voltage level $V_{QL}$ for signal Q+ during time period t1. Note that, in theory, voltages levels $V_{QTT+}$ and $V_{QTT-}$ would be the same if transistors 301, 306, and 308 are matched; transistors 303 and 305 are matched, transistors 300 and 307 are matched; and transistors 302 and 304 are matched. In reality, however, voltage levels $V_{QTT+}$ and $V_{QTT-}$ are slightly increased and decreased levels, respectively, of a voltage level $V_{QTT}$, due to mismatches of transistors 300 through 308 in pre-amplifier 310.

Pre-amplifier 310 comprises a plurality of transistors 300–308. As shown in FIG. 10, transistors 301, 306, and 308 have their sources tied together and coupled to ground. The drain of transistor 301 is connected to the source of transistor 300, which provides the output signal Q−. The drain of transistor 308 is connected to the source of transistor 307, which provides the output signal Q+. The drains of transistors 300 and 307, along with the sources of transistors 302 and 304, are tied together and coupled to voltage source Vcc. The gates of transistors 302 and 304 are tied together and coupled to ground. The drain of transistor 302 is connected to the drain of transistor 303 and to the gate of transistor 300. The drain of transistor 304 is connected to the drain of transistor 305 and to the gate of transistor 307. The sources of transistors 303 and 305 are tied together and coupled to the drain of transistor 306. The pre-amplifier 310 receives input signal SYMin at the gate of the transistor 303, receives input signal SYMinB at the gate of the transistor 305, and receives voltage Vbias at the gates of transistors 301, 306, and 308.

Figure 12:
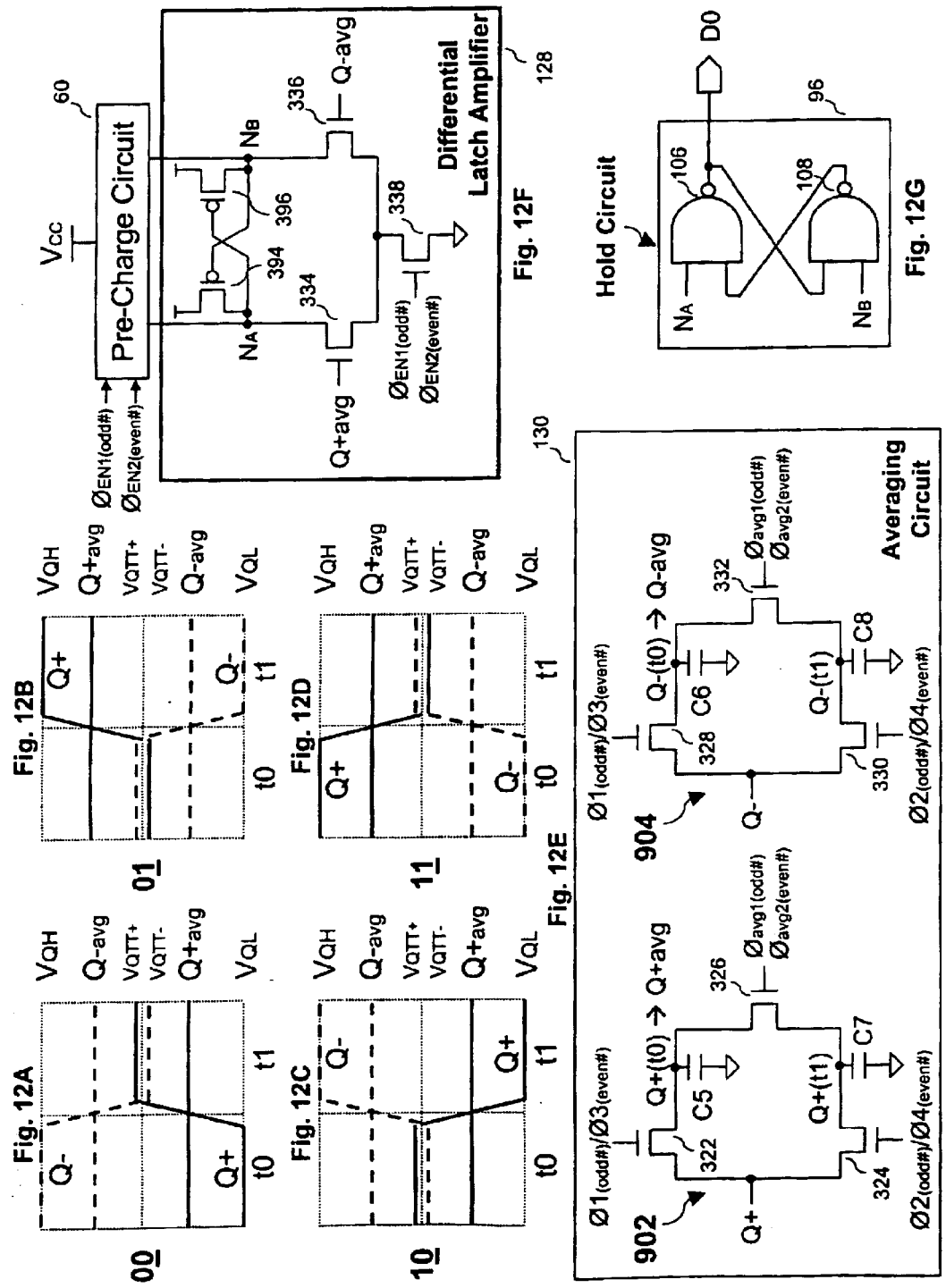
FIGS. 12A–12D are input waveforms showing transition and region for each of a plurality of symbols for region detection.
FIG. 12E is a schematic diagram of an averaging circuit for use in the region detector of FIG. 9, in accordance with an embodiment of the present invention.
FIG. 12F is a schematic diagram of a differential latch amplifier with a pre-charge circuit for use in the region detector of FIG. 9, in accordance with an embodiment of the invention.
FIG. 12G is a schematic diagram of a hold circuit for use in the region detector of FIG. 9, in accordance with an embodiment of the present invention.

In operation, the voltage $V_{TT}$ is used as a reference voltage for pre-amplifier 310 to convert the incoming symbols (i.e., SYMin waveforms) into differential outputs (i.e., Q+/Q− waveforms), which are provided to the inputs of transition detector 370 (illustrated and described in detail with reference to FIG. 11) and region detector 320 (illustrated and described in detail with reference to FIG. 12). This provides common-mode noise rejection capability for multi-symbol CMS receivers 46 (illustrated and described in detail with reference to FIGS. 5 and 9). Transistors 302–306 provide pre-amplification, for example, with an approximate gain of one, but with a very wide dynamic linear range. The output of this pre-amplification stage is provided to the gates of transistors 300 and 307, which are used to isolate the capacitive load from the transition detectors and region detectors to increase the bandwidth of the pre-amplification stage.

Transistors 302 and 304 are used as an active load for pre-amplifier 310, with the gates of transistors 302 and 304 grounded to generate a pre-determined gain. Transistors 301, 306, and 308 are used to supply a constant current for pre-amplifier 310. The voltage Vbias biases transistors 300, 301, 303, 305, 306, 307, and 308 in the saturation region to ensure a wide linear range operation (e.g., greater than 1 volt) for pre-amplifier 310. A wide linear range is a key factor in preventing pre-amplifier 310 from entering into saturation and ensuring that it can receive incoming symbols and output signals Q+ and Q− with the desired differential gain (e.g., a gain in the range of one to two). The common mode range of pre-amplifier 310 may also match with the common mode range of differential latch amplifiers 126 and 128 of transition detectors 370 and region detectors 320, respectively. Transistors 300 and 307 are configured as source-follower transistors used to buffer the intermediate pre-amplification outputs (i.e., nodes $N_C$ and $N_D$) of pre-amplifier 310 to avoid overloading due to transition detectors 370 and region detectors 320 and to produce a very high bandwidth pre-amplifier design for high speed input/output interface applications. The circuit operation of pre-amplifier 310 can be illustrated for exemplary symbol-10 of the SYMin waveforms. During time period to, input signal SYMin is at voltage level $V_{TT}$. Transistors 303 and 305 have the same gate voltage, resulting in symmetrical operation such that the voltage level at nodes $N_C$ and $N_D$ are approximately equal. Due to the source-follower configuration of transistors 300 and 307, the voltage level at the source of transistors 300 and 307 (i.e., the voltage output for nodes Q− and Q+) will be approximately equivalent to the voltage level at nodes $N_C$ and $N_D$ with small deviations from $V_{QTT}$. Consequently, output signals Q+ and Q− are at respective voltage levels $V_{QTT+}$ and $V_{QTT-}$, which corresponds to the voltage drop across transistors 303 and 306 or transistors 305 and 306, respectively. During time period ti, input signal SYMin is at voltage level $V_L$, which results in the voltage level at node $N_C$ being at a higher level than the voltage level at node $N_D$. Consequently, output signal Q− is at voltage level $V_{QH}$ while output signal Q+ is at voltage level $V_{QL}$, which corresponds to the difference between the voltage drops across transistors 303 and 306 and transistors 305 and 306, respectively, if the gain of the source followers is equal to one.

For an embodiment in which a single-ended Symbol signal is used for transmitting data, voltage $V_{TT}$ is received at the gate of transistor 305. In this case, the linear range of pre-amplifier 310 may be from 0.8V to 1.8V. Thus, if the voltage levels of incoming symbols to input gates 303 and 305 of pre-amplifier 310 fall into this range, then the receivers will operate properly. A suitable voltage range for $V_{TT}$ is 1.25V to 1.35V, which is in the middle of the linear range (i.e., 0.8V to 1.8V) of pre-amplifier 310. This implies a range for $V_H$ between 1.3V and 1.8V, and a range for $V_L$ between 0.8V and 1.3V. Note that if $V_{TT}$ is 1.25V, $V_L$ is no greater than approximately 1.2V, and if $V_{TT}$ is 1.35V, $V_H$ is no less than approximately 1.4V. The above mentioned voltage values are for Vcc equal to between 2.3V and 2.7V, and Vbias equal to approximately 0.2V above VTN, i.e., Vbias is in the range of 0.8V to 0.85V for 0.25 $\mu$m CMOS process technology. The minimum voltage swing between $V_H$ and $V_L$ should be greater than approximately 100 mV, but this value is dependent on channel characteristics and application. The voltage range of pre-amplifier 310 outputs Q+/Q− is in the range of 0.25V to 1.55V for this embodiment, i.e., $V_{QL}$ is approximately 0.25V and $V_{QH}$ is approximately 1.55V.

For an embodiment in which differential signals (Symbol and SymbolB) are used for transmitting data, the linear range can be essentially the same as that for the embodiment in which a single-ended Symbol signal is used—i.e., from 0.8V to 1.8V for 2.5V power supply and 0.25 um CMOS process technology). Furthermore, the operation of pre-amplifier 310 may be essentially the same as long as the voltage levels of the incoming symbols fall within this linear range. However, with pre-amplifier 310 operating on the incoming Symbol signal with a respective differential SymbolB signal, the voltage values on the transmission lines can be scaled down 50% relatively to the voltage values that would be required for a single-ended Symbol single (with no differential SymbolB signal present). Accordingly, the voltage swings of SYMoutB and SYMout can be reduced by half, thereby further reducing EMI effects by requiring lower voltage values. Thus, for applications which are especially sensitive to EMI, the differential transmission signal approach is preferred over the single-ended transmission signal approach due to the reduced signal swing and cancellation of EM radiation when the differential channels are running in parallel in PCB or in a twisted pair cable environment.

Transition Detector

FIGS. 11A–11D illustrate input waveforms to a transition detector 370, showing region and transition for symbol-00, symbol-01, symbol-10, and symbol-11, respectively, at time periods to and t1, as discussed above with respect to FIG. 2. Time period to is the first half cycle of the clock, and time period ti is the second half cycle of the clock. Time period to can begin at the rising edge of the clock, with time period t1 beginning at the falling edge, or vice versa. FIGS. 11A–11D also show differential signals Q– and Q+ from pre-amplifier 310 of FIG. 10. FIGS. 11A–11D help illustrate the operation of a transition detector 370 for detecting data bit D1 of a two-bit symbol.

In FIG. 11A, for symbol-00, at time period to, signal Q– is at high voltage $V_{QH}$, and signal Q+ is at low voltage $V_{QL}$. At time period t1, signals Q– and Q+ go to voltage levels $V_{QTT-}$ and $V_{QTT+}$, respectively. The solid trace in each of FIGS. 11A–11D, indicating signal Q+, represents the desired pattern for the data bits in each symbol. Thus, as seen from FIG. 11A, the solid trace has the same shape as the trace shown in FIG. 2 for symbol-00. The dashed trace represents the Q– output signal from pre-amplifier 310. FIG. 11B shows the transition and region levels for symbol-01. At time period to, signals Q+ and Q– are at voltage levels $V_{QTT-}$ and $V_{QTT+}$, respectively. Then, at time period t1, signal Q+ goes to high voltage $V_{QH}$, while signal Q– goes to low voltage $V_{QL}$. Note that the slope of Q+ in FIGS. 11A and 11B is positive (or rising transition), indicating data bit D1 is 0.

FIG. 11C shows the transition and region levels for symbol-10, with signal Q+ going from voltage $V_{QTT+}$ at time period to down to low voltage $V_{QL}$ at time period t1, while signal. Q– goes from voltage $V_{QTT-}$ at time period to up to high voltage $V_{QH}$ at time period t1. FIG. 11D shows the slope and voltage levels for symbol-11. At time period to, signal Q+ is at high voltage $V_{QH}$, while signal Q– is at low voltage $V_{QL}$. At time period t1, signal Q+ drops to voltage $V_{QTT-}$, while signal Q– rises to voltage $V_{QTT+}$. In both FIGS. 11C and 11D, the slope of Q+ is negative (or falling transition), indicating that data bit D1 is 1.

For each symbol in a received signal, transition detector 370 determines the defining transition (e.g., rising or falling) and generates data accordingly. In one embodiment, transition detector 370 identifies the direction of the transition (positive or negative slope) and generates data according to the direction of transition. For example, transition detector 370 outputs a high signal (corresponding to a logic-1 value) when signal Q+ exhibits a falling transition (negative slope) and signal Q– exhibits a rising transition (positive slope) transitioning from time period t0 to time period t1, such as for symbol-10 and symbol-11. On the contrary, transition detector 370 outputs a low signal (corresponding to a logic-0 value) when the signal Q+ experiences a rising transition (positive slope) and signal Q– experiences a falling transition (negative slope) from time period t0 to time period ti, such as for symbol-00 and symbol-01.

FIGS. 11E–11G show portions of transition detector 370 of FIG. 9, according to one embodiment of the present invention. FIG. 11E is a circuit diagram of a differencing circuit 94, FIG. 11F is a diagram of a differential latch amplifier 126 with a pre-charge circuit 60, and FIG. 11G is a diagram of a hold circuit 96. Transition detector 370 includes two differencing circuits 94, two differential latch amplifiers 126 and pre-charge circuits 60, and two hold circuits 96. One set of circuits is utilized for the odd-numbered clock cycles and the other set is utilized for the even-numbered clock cycles. Using odd and even clock cycles allows data to be sampled in one operation and processed and decoded in a second operation. This "interleaving" allows for high clock/data rate operations. For illustration, differencing circuit 94, differential latch amplifier 126 and pre-charge circuit 60, and hold circuit 96 will be described for use with the odd-numbered clock cycles and phase signals Ø1, Ø2, and $Ø_{EN1}$. Although not shown, a similar set of circuits is used with the even-numbered clock cycles and phase signals Ø3, Ø4, and $Ø_{EN2}$, which are shown in the figures to illustrate their application to desired input terminals of the various circuits.

Referring to FIG. 1E, differencing circuit 94 samples and stores differential signals Q+ and Q– from pre-amplifier 310 of FIG. 10 at time periods to and t1. Differencing circuit 94 is divided into two sub-circuits 802 and 804. Sub-circuit 802 stores the value of signal Q+ in a capacitor C1 at time period to and in a capacitor C3 at time period t1. Sub-circuit 804 stores the value of signal Q– in a capacitor C2 at time period to and in a capacitor C4 at time period t1. Sub-circuit 802 includes transistors 372 and 374, such as NMOS transistors, each having a terminal coupled to signal Q+. The gates of transistors 372 and 374 receive phase signals Ø1 and Ø2, respectively, to turn transistors 372 and 374 off and on. Phase signals Ø1 and Ø2 can be overlapping and are generated from the symbol clock signal, which is one-half the frequency of the clock (CLK) signal. (See FIG. 14 for relationships between phase signals Ø1, Ø2, Ø3, and Ø4 with the symbol clock and clock (CLK) signals.)

At the falling edge of phase signal Ø1 (corresponding to sampling during time period to), transistor 372 is turned off. As a result, the value of signal Q+ at time period to, denoted as Q+(t0), is stored in capacitor C1, which has one plate coupled to the other terminal of transistor 372. The opposite plate of capacitor C1 is coupled to ground. Capacitor C1 then holds the stored value when transistor 372 is off. At the falling edge of phase signal Ø2 (corresponding to sampling during time period t1), transistor 374 is turned off. Thus, the value of signal Q+ at time period ti, denoted as Q+(t1), is stored in capacitor C3, which has one plate coupled to the other terminal of transistor 374 and the other plate coupled to ground. Again, when transistor 374 is off, capacitor C3 holds the stored value.

Sub-circuit 804 is the same as sub-circuit 802, except that signal Q–, instead of signal Q+, is coupled to transistors 376 and 378. At the falling edge of phase signal Ø1, capacitor C2 stores the value of signal Q– at time period to, denoted as Q–(t0). At the falling edge of phase signal Ø2, capacitor C4 stores the value of signal Q– at time period t1, denoted as Q–(t1).

Accordingly, for each symbol, capacitors C1–C4 store a unique combination of voltages. For example, for symbol-10 (FIG. 11C), at time period t0, signals Q+ and Q− are voltage levels $V_{QTT+}$ and $V_{QTT-}$, respectively. For some predetermined amount of time (e.g., at least half a cycle of the CLK signal) before going low during time period to, phase signal Ø1 is high, thereby turning on transistor 372 of sub-circuit 802 and transistor 376 of sub-circuit 804. Thus, voltage values of $V_{QTT+}$ and $V_{QTT-}$ are stored in capacitor C1 and C2, respectively, at the falling edge of phase signal Ø1. At time period t1, Q+ is at low voltage $V_{QL}$, and Q− is at high voltage $V_{QH}$. For some predetermined amount of time (e.g., at least half a cycle of the CLK signal) before going low during time period t1, phase signal Ø2 is high, which turns on transistors 374 and 378 of respective sub-circuits 802 and 804. This in turn allows Q+(t1), which has a value of $V_{QL}$, to be stored in capacitor C3 and Q−(t1), which has a value of $V_{QH}$, to be stored in capacitor C4 at the falling edge of phase signal Ø2. The values stored in capacitors C1 through C4 represent unique signal transition information of the symbol; these values may be received at the inputs of differential latch amplifier 126.

Differential latch amplifier 126 with pre-charge circuit 60, shown in FIG. 11F, includes transistors 380, 382, 384, and 386 (which can be N-type or NMOS transistors) having gates coupled to receive voltages stored in respective capacitors C1, C2, C3, and C4 (i.e., Q+(t0), Q−(t0), Q+(t1), and Q−(t1)). Differential latch amplifier 126 amplifies voltages at nodes NA and NB, which are based on the different current flow through transistors 380, 382, 384, and 386 resulting from the voltage differences at the gates of transistors 380, 382, 384, and 386. Voltages at nodes $N_A$ and $N_B$ are then applied to a latch or hold circuit (discussed below with FIG. 11G) to supply the desired data bit.

A first terminal, such as a source terminal, of each of transistors 380, 382, 384, and 386 is commonly coupled to one terminal of a transistor 388 (e.g., N-type), with the other terminal of transistor 388 coupled to ground. Phase signal $Ø_{EN1}$ (for odd-numbered clock cycles) is received at the gate of current source transistor 388 to allow current flow through transistors 380, 382, 384, and 386. Voltage differences between the gates of transistors 380, 382, 384, and 386 generate different current flow through the transistors.

Pre-charge circuit 60, described in more detail below, charges nodes $N_A$ and $N_B$ to a logic-1 value before phase signal $Ø_{EN1}$ turns on current source transistor 388. Thus, when phase signal $Ø_{EN1}$ is low, pre-charge circuit 60 is on and pre-charges nodes $N_A$ and $N_B$, and when phase signal $Ø_{EN1}$ is high, pre-charge circuit 60 is off. Pre-charge circuit 60 brings nodes $N_A$ and $N_B$ to a "high" or logic-1 value, such as approximately the supply voltage Vcc minus the threshold voltage VTP of P-type transistors 390 and 392, with each having a first terminal, such as the drain terminal, coupled to nodes $N_A$ and $N_B$, respectively. Node $N_A$ is also coupled to the second terminal (such as the drain terminal) of each of transistors 380 and 386, to the first terminal (such as the drain terminal) of transistor 390, and to the gate of transistor 392. Node $N_B$ is also coupled to the second terminal (such as the drain terminal) of each of transistors 382 and 384, to the first terminal (such as the drain terminal) of transistor 392, and to the gate of transistor 390. The second terminal (such as the source terminal) of each of transistors 390 and 392 is coupled to source voltage Vcc.

Based on the difference of the sampled voltages Q+(t0), Q−(t0), Q+(t1), and Q−(t1), different magnitudes of current flow through transistors 380, 382, 384, and 386 and nodes $N_A$ and $N_B$ when transistor 388 is turned on. P-type transistors 390 and 392 increases the voltage difference between nodes $N_A$ and $N_B$. As an illustration, symbol-00 results in Q+(t0)=$V_{QL}$, Q−(t0)=$V_{QH}$, Q+(t1)=$V_{QTT+}$, Q−(t1)=$V_{QTT-}$. Because the voltage (i.e., $V_{QH}$) at the gate of transistor 382 is higher than the voltage (i.e., $V_{QL}$) at the gate of transistor 380, more current will flow through transistor 382 than through transistor 380. Transistors 384 and 386 flow through very small differential current because the differential voltages at the gates of transistors 384 and 386 are very small (i.e., $V_{QTT+}-V_{QTT-}$). Thus, the current flow through node $N_B$, which is coupled to transistor 382, is greater than through node $N_A$, which is coupled to transistor 380. This causes the voltage at node $N_B$ to be pulled down toward ground from its pre-charge voltage by transistors 382, 384, and 388, while the voltage at node $N_A$ remains high. As a result, transistor 390 is turned on, which pulls the voltage at node $N_A$ to Vcc, while transistor 392 is turned off, which leaves the voltage at node $N_B$ low or at ground. Table 1 below lists the symbols, each symbol's corresponding values for signals Q+ and Q− at time periods t0 and t1, and the voltage levels at nodes $N_A$ and $N_B$.

TABLE 1

| Symbol D1D0 | Voltage Q+ (t0) | Voltage Q− (t0) | Voltage Q+ (t1) | voltage Q− (t1) | Logic level $N_A$ | Logic level $N_B$ |
|---|---|---|---|---|---|---|
| 00 | $V_{QL}$ | $V_{QH}$ | $V_{QTT+}$ | $V_{QTT-}$ | 1 | 0 |
| 01 | $V_{QTT-}$ | $V_{QTT+}$ | $V_{QH}$ | $V_{QL}$ | 1 | 0 |
| 10 | $V_{QTT+}$ | $V_{QTT-}$ | $V_{QL}$ | $V_{QH}$ | 0 | 1 |
| 11 | $V_{QH}$ | $V_{QL}$ | $V_{QTT-}$ | $V_{QTT+}$ | 0 | 1 |

Voltages at nodes $N_A$ and $N_B$ are then supplied to hold circuit 96, which includes cross-coupled NAND gates 106 and 108. The voltage at node $N_A$ is applied to one input of NAND gate 106, with the other input coupled to the output of NAND gate 108. The voltage at node $N_B$ is applied to one input of NAND gate 108, with the other input coupled to the output of NAND gate 106. The output of hold circuit 96 is taken at the output of NAND gate 106 and represents the data bit D1 of the symbol. Thus, continuing with the above example, node $N_B$ is at a low voltage, which results in the output of NAND gate 108 providing a high input to NAND gate 106. Because the voltage at node $N_A$ is also high, the output of NAND gate 106, and thus data bit D1, is low. When node $N_A$ is at a logic-1 value and node $N_B$ is at a logic-0 value, data bit D1 is at a logic-0 value. Conversely, when node $N_A$ is at a logic-0 value and node $N_B$ is at a logic-1 value, data bit D1 is at a logic-1 value.

Region Detector

While transition detector 370 decodes the D1 data bit, a region detector 320 decodes the data bit D0. In general, region detector 320 determines the defining region within which each symbol of a carrier signal lies. In one embodiment, region detector 320 determines whether the average voltage value of a symbol is above or below a particular voltage level, such as $V_{QTT+}/V_{QTT-}$. As described above, a lower region (i.e., a region below $V_{QTT+}/V_{QTT-}$) indicates that data bit D0 is 0, while an upper region (i.e., a region above $V_{QTT+}/V_{QTT-}$) indicates that data bit D0 is 1. FIGS. 12A–12D are waveforms similar to those of FIGS. 11A–11D, except that, in addition to waveforms input to region detector 320, FIGS. 12A–12D also show average values of signals Q+ and Q− for each of symbol-00, symbol-01, symbol-10, and symbol-11, respectively, generated from the input signals Q+ and Q− at time periods t0 and t1. For each of FIGS. 12A–12D, the solid line shows the average value for Q+, designated Q+avg, and the dashed line shows the average value for Q–, designated Q–avg. As seen from FIGS. 12A and 12C, data bit D0 is 0 when the value of Q+avg is below $V_{QTT+}$ or $V_{QTT-}$ and the value of Q–avg is above $V_{QTT+}/V_{QTT-}$. From FIGS. 12B and 12D, data bit D0 is 1 when the value of Q+avg is above $V_{QTT+}/V_{QTT-}$ and the value of Q–avg is below $V_{QTT+}/V_{QTT-}$, or when Q+avg is above Q–avg.

FIGS. 12E–12G show portions of region detector 320 of FIG. 9, according to one embodiment of the present invention. FIG. 12E is a circuit diagram of an averaging circuit 130 for generating values Q+avg and Q–avg, FIG. 12F is a diagram of a differential latch amplifier 128 with a pre-charge circuit 60, and FIG. 12G is a diagram of a hold circuit 96. As with the discussion of the transition detector 370, region detector 320 includes two averaging circuits 130, two differential latch amplifiers 128, and two hold circuits 96. One set is utilized for the odd-numbered clock cycles and phase signals Ø1, Ø2, Øavg1, and $Ø_{EN1}$, which is discussed below, and the other set is utilized for the even-numbered clock cycles and phase signals Ø3, Ø4, Øavg2, and $Ø_{EN2}$, which are shown as inputs to various terminals of circuits for illustration.

Averaging circuit 130 includes a first sub-circuit 902 for generating Q+avg from input signal Q+ and a second sub-circuit 904 for generating Q–avg from input signal Q–. During time period t0, phase signal Ø1 is high, which turns on transistors 322 and 328 in respective sub-circuits 902 and 904. A first terminal of transistor 322 receives as input signal Q+, and a first terminal of transistor 328 receives as input signal Q–. The second terminal of each of transistors 322 and 328 is coupled to a first plate of capacitors C5 and C6, respectively, with the other plate being coupled to ground. Thus, at the falling edge of phase signal Ø1, the value of Q+ at time period t0 is stored in capacitor C5 and the value of Q– at time period t0 is stored in capacitor C6.

Next, phase signal Ø2 goes high during time period t1, which turns on transistor 324 of sub-circuit 902 and transistor 330 of sub-circuit 904. A first terminal of transistor 324 receives as input signal Q+, and a first terminal of transistor 330 receives as input signal Q–. The second terminals of transistors 324 and 330 are coupled to a first plate of respective capacitors C7 and C8, with the other plate coupled to ground. Accordingly, at the falling edge of phase signal Ø2, the value of Q+ at:time period t1 is stored in capacitor C7 and the value of Q– at time period t1 is stored in capacitor C8. Thus, after one odd-numbered clock cycle, the voltage levels of Q+ at time period t0 (Q+(t0)), Q– at time period t0 (Q–(t0)), Q+at time period t1 (Q+(t1)), and Q– at time t1 (Q–(t1)) are stored in capacitors C5–C8, respectively. For example, for the case of FIG. 12A, capacitor C5 stores $V_{QL}$, capacitor C6 stores $V_{QH}$, and capacitors C7 and C8 store $V_{QTT+}$ and $V_{QTT-}$, respectively.

After capacitors C5–C8 have stored the voltages of Q+ and Q– at time periods t0 and t1, phase signal Øavg1 goes high (at the falling edge of phase signal Ø2), which turns on transistor 326 of sub-circuit 902 and transistor 332 of sub-circuit 904. One terminal of transistor 326 is coupled to the first plate of capacitor C5 and the other terminal of transistor 326 is coupled to the first plate of capacitor C7, with the capacitance of capacitors C5 and C7 designed to be equal. When phase signal Øavg1 is high, transistor 326 turns on and creates a voltage divider circuit. Thus, the resulting voltage at the first plate of either capacitor C5 or C7 is the average of the values stored in capacitors C5 and C7, i.e., [Q+(t0)+Q+(t1)]/2, or the average of signal Q+ for time periods t0 and t1, designated Q+avg.

Similarly, for sub-circuit 904, when phase signal $Ø_{avg1}$ goes high, transistor 332 turns on, which results in an averaging of the voltages stored in capacitors C6 and C8. The value at the first plate capacitor C6 and C8 is the average of signal Q– at time periods t0 and t1 or approximately [Q–(t0) +Q–(t1)]/2, designated Q– avg. Using the earlier example for symbol-00, Q+avg and Q–avg are shown as the straight solid and dashed lines, respectively, in FIG. 12A.

Signals Q+avg and Q–avg from averaging circuit 130 are received at differential inputs of differential latch amplifier 128, shown in FIG. 12F along with pre-charge circuit 60. Differential latch amplifier 128 increases a voltage difference at two nodes $N_A$ and $N_B$ resulting from the voltage difference between Q+avg and Q–avg. Signal Q+avg is received at the gate of transistor 334, and signal Q–avg is received at the gate of transistor 336. Both transistors 334 and 336 have one terminal, such as the source terminal, coupled to the drain of a current source transistor 338. The gate of transistor 338 receives the phase signal $Ø_{EN1}$ to turn transistor 338 on and off. Also, both transistors 334 and 336 have the other terminal coupled to pre-charge circuit 60. As discussed above and further below, when phase signal $Ø_{EN1}$ is low, pre-charge circuit 60 charges nodes $N_A$ and $N_B$ to a "high" or logic "1" level, such as approximately the supply voltage Vcc minus the threshold voltage VTP of P-type transistors 394 and 396. When phase signal $Ø_{EN1}$ goes high (when signals Q+avg and Q–avg become available), the one of transistors 334 or 336 that has the higher voltage at its gate will have more current flowing through it than the other transistor. Signals Q+avg and Q–avg are biased in the common-mode range of differential latch amplifier 128, which has a lower bound voltage slightly higher than VTN of transistors 334 and 336 in order to turn on transistors 334 and 336. Normally, signals Q+avg and Q–avg have voltage values no lower than approximately 0.4V to 0.5V above VTN of transistors 334 and 336.

In addition, transistors 394 and 396 will amplify this current difference of nodes $N_A$ and $N_B$. P-type transistors 394 and 396 increase the voltage difference between node $N_A$, which is coupled to the gate of transistor 396 and a first terminal of transistor 394, and node $N_B$, which is coupled to the gate of transistor 394 and a first terminal of transistor 396. The second terminal of transistors 394 and 396 is coupled to supply voltage Vcc. Thus, the one of nodes $N_A$ or $N_B$ associated with the transistor 334 or 336 that has the lower voltage applied to its gate will be pulled to Vcc from pre-charge voltage Vcc–VTP or a logic-1 value, while the other node having the transistor with the higher gate voltage will be pulled low or a logic-0 value. Continuing with the above example, for symbol-00, the value of Q+avg (applied to transistor 334) is below $V_{QTT-}$ and the value of Q–avg is above $V_{QTT+}$ (applied to transistor 336). Consequently, when transistor 338 turns on, more current flows through transistor 336 than through transistor 334. The voltage at node $N_B$ is then pulled lower from its pre-charge voltage (e.g., to ground), while the voltage at node $N_A$ remains high. This turns on transistor 394 to pull the voltage at node $N_A$ high to Vcc and turns off transistor 396 to leave the voltage at node $N_B$ unchanged at low or ground. Table 2 below lists the symbols, each symbol's corresponding values for signals Q+avg and Q–avg, and the voltage level at nodes $N_A$ and $N_B$, where ΔV is $[V_{QTT+}-V_{QL}]/2$ or $[V_{QH}-V_{QTT-}]/2$, assuming the magnitude of the difference between $V_{QTT+}$ and $V_{QH}$ and between $V_{QTT-}$ and $V_{QL}$ is the same. $V_{QTT}$ is defined as the average of $V_{QTT+}$ and $V_{QTT-}$. The minimum value of ΔV is typical about 50 mV.

TABLE 2

| Symbol D1D0 | Voltage Q+ avg | Voltage Q− avg | Logic level $N_A$ | Logic level $N_B$ |
|---|---|---|---|---|
| 00 | $V_{QTT-} \Delta V$ | $V_{QTT+} \Delta V$ | 1 | 0 |
| 01 | $V_{QTT+} \Delta V$ | $V_{QTT-} \Delta V$ | 0 | 1 |
| 10 | $V_{QTT-} \Delta V$ | $V_{QTT+} \Delta V$ | 1 | 0 |
| 11 | $V_{QTT+} \Delta V$ | $V_{QTT-} \Delta V$ | 0 | 1 |

Note that for differential latch amplifier 126 (FIG. 11F) and differential latch amplifier 128 (FIG. 12F), at least one of the two inputs to each of transistor pairs 380 and 382 (FIG. 11F), 384 and 386 (FIG. 11F), and 334 and 336 (FIG. 12F) is approximately 0.4V to 0.5V greater than the VTN of the corresponding transistor pair in order to turn on the transistors and allow the differential latch amplifiers 126 and 128 to operate properly. The voltage value 0.4V to 0.5V is determined by current source transistors 388 (FIG. 11F) and 338 (FIG. 12F).

The voltages at nodes $N_A$ and $N_B$ are input to latch or hold circuit 96, shown in FIG. 12G, which is the same as described above in FIG. 11G. The operation of hold circuit 96 is the same as with the circuit described in FIG. 11G, with the output of the hold circuit of FIG. 12G representing data bit D0 instead of D1. For example, with symbol-00, the voltage at node $N_A$ is high and the voltage at node $N_B$ is low. This results in the output of NAND gate 106, and therefore, the output of hold circuit 96, being at a logic-0 value representing data bit D0 of 0. Thus, a transition detector 370, which decodes data bit D1, and a region detector, which decodes data bit D0, are used in conjunction to decode a multi-bit signal D1D0.

Pre-Charge Circuit

Figure 13:
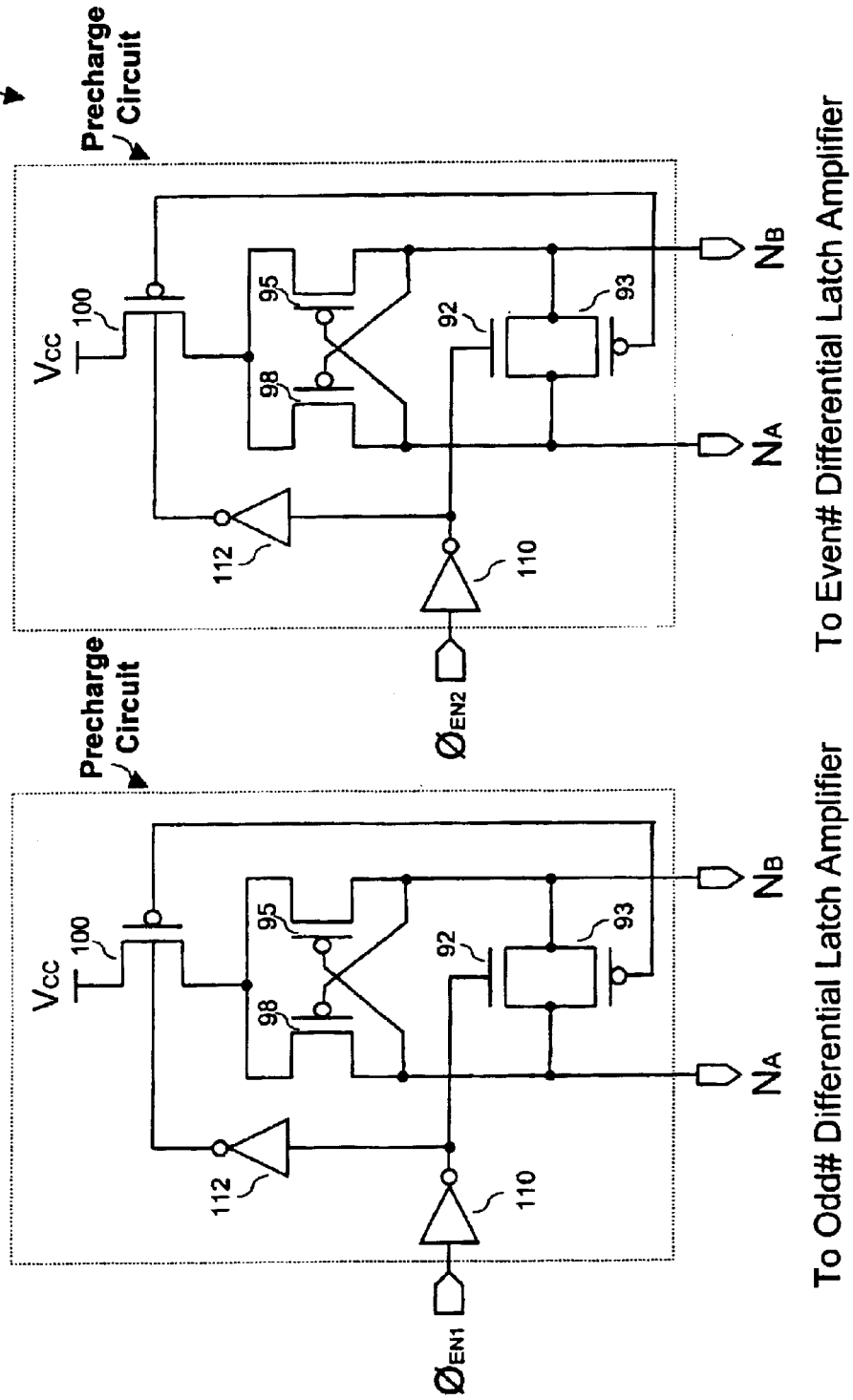
FIG. 13 is a schematic diagram of a pre-charge circuit for use with the differential latch amplifiers of FIGS. 11F and 12F, in accordance with an embodiment of the present invention.

FIG. 13 is a circuit diagram of one embodiment of pre-charge circuit 60 for use with the differential latch amplifiers 126 and 128 of FIGS. 11F and 12F, respectively. Pre-charge circuit 60 includes two inverters 110 and 112 to generate signals from phase signal $Ø_{EN1}$ for operation of the circuit 60 during odd-numbered clock cycles. Note that a similar circuit is shown for use with phase signal $Ø_{EN2}$ for even-numbered clock cycles. When phase signal $Ø_{EN1}$ is low (prior to the operation of differential latch amplifier 126 (FIG. 11F) and differential latch amplifier 128 (FIG. 12F)), the output of inverter 110, which is coupled to the gate of transistor 92, is high, thereby turning on transistor 92. Also, when phase signal $Ø_{EN1}$ is low, the output of inverter 112, which is coupled between the output of inverter 110 and the gate of P-type transistors 100 and 93, is low, thereby turning on transistors 100 and 93. A first terminal of equalization transistors 92 and 93 is coupled to node $N_A$, and the second terminal of transistors 92 and 93 is coupled to node $N_B$. Nodes $N_A$ and $N_B$ are also coupled, via P-type transistors 95, 98, and 100, to supply voltage Vcc. Thus, when phase signal $Ø_{EN1}$ is low, transistors 92, 93, 95, 98, and 100 are on, and equalization transistors 92 and 93 equalize the voltages at nodes $N_A$ and $N_B$ to 0.5 Vcc initially and eventually nodes $N_A$ and $N_B$ will be pulled to Vcc−VTP from 0.5 Vcc by transistors 95, 98, and 100.

A first terminal, such as the source terminal, of transistor 100 is coupled to supply voltage Vcc. Transistor 100 serves as virtual Vcc control for P-type transistors 95 and 98 to shut off the supply current from Vcc to differential latch amplifier 126 (FIG. 11F) and differential latch amplifier 128 (FIG. 12F) to minimize the operating current, and to allow very high-speed sensing of the differential latch amplifiers to pull nodes $N_A$ and $N_B$ towards Vcc and ground. When transistor 100 is on, the second terminal, such as the drain terminal, of transistor 100 is at a high voltage. The second terminal of transistor 100 is coupled to a first terminal, such as the source terminal, of P-type transistors 95 and 98, thus resulting in a high voltage placed thereon. The gate of transistor 95 is coupled to the second terminal (such as the drain terminal) of transistor 98, while the gate of transistor 98 is coupled to the second terminal (such as the drain terminal) of transistor 95. Consequently, transistors 95 and 98 are turned on, and the second terminal of transistors 95 and 98 are charged to a high voltage or a logic-1 value (e.g., the supply voltage Vcc minus the threshold voltage VTP of transistors 95 and 98). Note that, in one embodiment, transistor pairs 390 and 392 (FIG. 11F), 394 and 396 (FIG. 12F), and 95 and 98 (FIG. 13) are designed to have about the same threshold voltage VTP, i.e., the same transistor width and length and have the same layout topology/orientation for each transistor pair. Nodes $N_A$ and $N_B$ are coupled to the second terminals of transistors 98 and 95, respectively, so that transistors 95, 98, and 100 pull up the voltage at nodes $N_A$ and $N_B$ from 0.5Vcc to Vcc−VTP. Nodes $N_A$ and $N_B$ are also coupled to the gates of transistors 95 and 98, respectively.

At power up, nodes $N_A$ and $N_B$ will be either at a low or high voltage. If both nodes are high, the leakage current of the P-N junctions of drains of transistors 92, 93, 95, and 98 will drain the voltage at nodes $N_A$ and $N_B$ to a steady state, which is Vcc−VTP. If both nodes are low, transistors 95 and 98 will pull the voltage at nodes $N_A$ and $N_B$ up to Vcc−VTP. If one of nodes $N_A$ or $N_B$ is either high or low, transistors 95 and 98 will pull the low voltage node to Vcc−VTP, and the high voltage node will be drained down to Vcc−VTP by the leakage current of the P-N junctions of drains of transistors 92, 93, 95, and 98. Therefore, after power up, both nodes $N_A$ and $N_B$ will be at Vcc−VTP before the receiver circuit starts to receive the incoming symbol during a data transfer cycle.

Timing Diagram for Multi-Symbol Receiver

Figure 14:
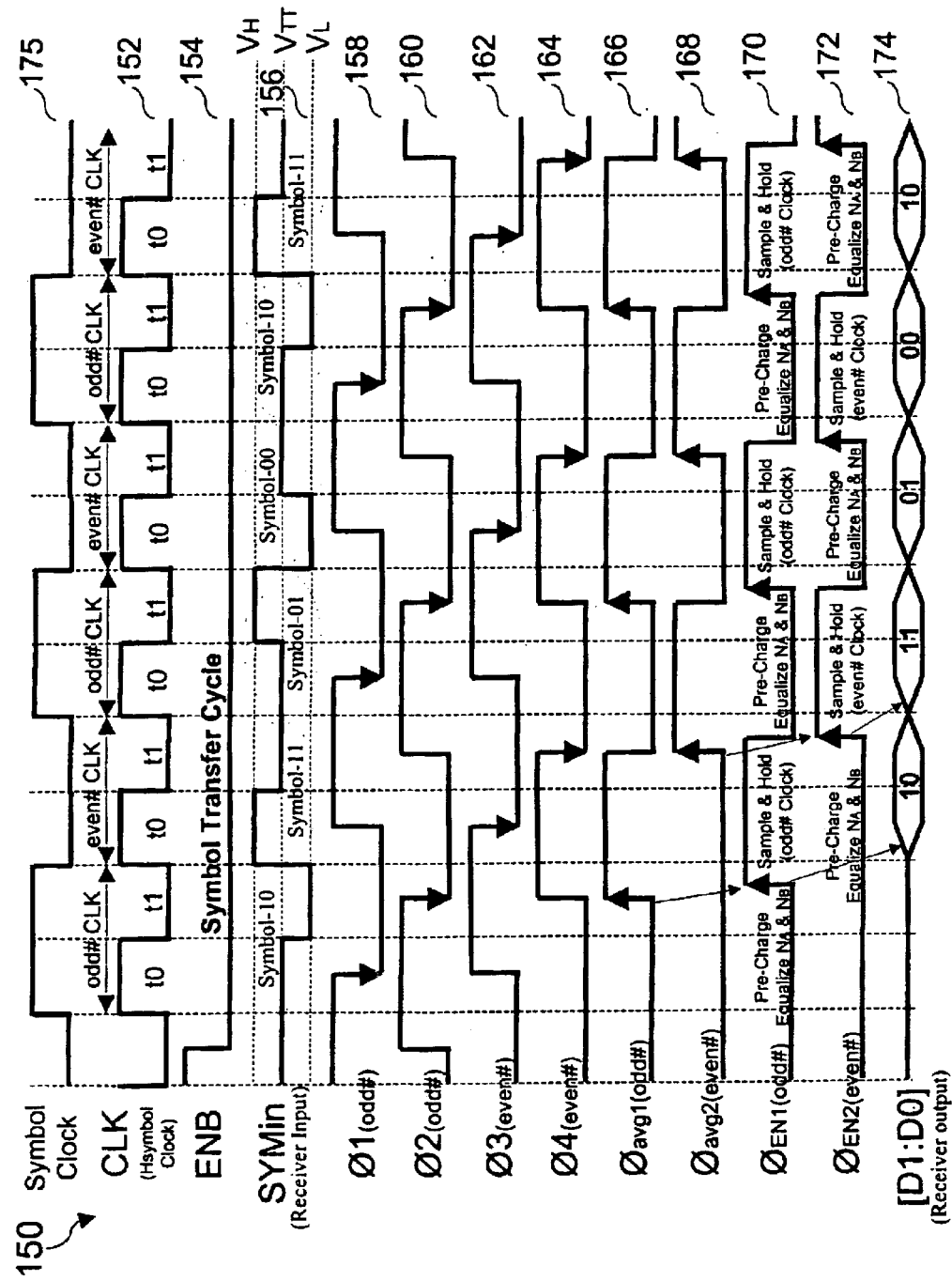
FIG. 14 is a timing diagram for multi-symbol data transfer control, in accordance with an embodiment of the present invention.

FIG. 14 is an exemplary timing diagram 150 for multi-symbol data transfer control for a multi-symbol receiver 48 in accordance with an embodiment of the present invention. The timing diagram illustrates the timing for a multi-symbol receiver 48 that receives an input signal SYMin and outputs decoded values D1 and D0.

The timing diagram includes exemplary waveforms for various signals including a symbol clock signal waveform 175, a clock (CLK) signal waveform 152, an enable (ENB) signal waveform 154, input signal SYMin waveform 156, multi-phase clock signal Ø1 waveform 158, Ø2 waveform 160, Ø3 waveform 162, Ø4 waveform 164, $Ø_{avg1}$ waveform 166, $Ø_{avg2}$ waveform 168, $Ø_{EN1}$ waveform 170, and $Ø_{EN2}$ waveform 172, and output values of data bits D1 and D0 waveform 174, all described in detail above. The symbol clock signal may be the same as a system clock signal. The CLK signal, which can be derived from the symbol clock signal, may be twice the frequency symbol clock signal. As such, the CLK signal may be considered to be a "half symbol" or "hsymbol" clock signal because its period is half that of the symbol clock signal. The CLK signal is segmented into alternating odd and even-numbered clock cycles that, among other things, allows for a high clock and data rate, with each odd and even-numbered clock cycle divided into two half-cycles of duration t0 and t1. The ENB signal initiates the symbol transfer cycle when it drops to a low voltage level or logic-0 value. The input signal SYMin is received at the input of the multi-symbol receiver 48 and is shown with exemplary voltage transitions for various symbol waveforms (i.e., symbol-10, symbol-11, symbol-01, symbol-00, etc.). For example, symbol-10 is shown which transitions from a voltage level $V_{TT}$ at time period t0 to a voltage level $V_L$ at time period t1 during an odd-numbered CLK cycle.

The phase signals Ø1 and Ø2 provide the timing during odd-numbered clock cycles while the phase signals Ø3 and Ø4 provide the timing during even-numbered clock cycles. Phase signal Ø1 is high during the transition from time period to (from a previous even-numbered clock cycle) to time period to in odd-numbered clock cycles, while phase signal Ø2 is high during the transition from time period t1 (from a previous even-numbered clock cycle) to time period t1 in odd-numbered clock cycles. Similarly, for even-numbered clock cycles, phase signal Ø3 is high during the transition from time period to (from a previous odd-numbered clock cycle) to time period t0, and phase signal Ø4 is high during the transition from time period t1 (from a previous odd-numbered clock cycle) to time period t1. The frequency of each of phase signals Ø1, Ø2, Ø3, and Ø4 is the same as the frequency of the symbol clock signal.

The phase signals $Ø_{avg1}$ and $Ø_{EN1}$ provide the timing during odd-numbered clock cycles, with phase signal $Ø_{avg1}$ providing the timing for the averaging circuit 130 (FIG. 12E) and phase signal $Ø_{EN1}$ providing the timing for differential latch amplifier 126 (FIG. 11F) and differential latch amplifier 128 (FIG. 12F). The phase signals $Ø_{avg2}$ and $Ø_{EN2}$ provide the timing during even-numbered clock cycles, with phase signal $Ø_{avg2}$ providing the timing for the averaging circuit 130 and phase signal $Ø_{EN2}$ providing the timing for the differential latch amplifiers of the transition detector 370 and region detector 320. Phase signals $Ø_{avg1}$ and $Ø_{avg2}$ go high after respective phase signals Ø2 and Ø4 go low (at which time voltages have been stored in the capacitors) to initiate the averaging operation. Phase signals $Ø_{avg1}$ and $Ø_{avg2}$ remain high for a time sufficient to average the voltages stored in the capacitors. Phase signals $Ø_{EN1}$ and $Ø_{EN2}$ are low during pre-charging and equalization of nodes $N_A$ and $N_B$, which occurs during the sampling operation of the differential signals Q+ and Q−. Phase signals $Ø_{EN1}$ and $Ø_{EN2}$ may then go high immediately after the averaging of Q− and Q+ and stay high while difference signals are amplified and held. At this time, the data bits D1 and D0 are available.

The waveforms illustrated in timing diagram 150 of FIG. 14 are provided to facilitate an understanding of the timing control associated with the multi-symbol receiver 48 and serves to summarize an exemplary timing control for processing the data, as described further herein.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. An apparatus for recovering data from multi-symbol signaling comprising:
   a pre-amplifier operable to receive a carrier signal conveying a plurality of symbols, each symbol uniquely defined by a signal transition and a signal region in the carrier signal, each symbol representing a plurality of data, wherein the pre-amplifier is operable to generate a pair of differential signals for the carrier signal;
   a region detector coupled to the pre-amplifier and operable to determine the defining signal region for each symbol; and
   a transition detector coupled to said pre-amplifier and operable to determine the defining signal transition for each symbol, wherein the transition detector comprises a differencing circuit operable to store a first value for each of the pair of differential signals in a first time period and a second value for each of the pair of differential signals in a second time period.

2. The apparatus of claim 1 wherein a signal region is defined with reference to a predetermined voltage.

3. The apparatus of claim 1 wherein a signal transition is defined by a change in signal level.

4. The apparatus of claim 1 wherein a signal transition can be either a rise or a fall in signal level.

5. The apparatus of claim 1 wherein the transition detector is operable to sample each of the pair of differential signals at least twice for each symbol.

6. The apparatus of claim 1 wherein the transition detector comprises a differential latch amplifier coupled to the differencing circuit, the differential latch amplifier operable to receive the stored first and second values for each of the pair of differential signals, the differential latch amplifier operable to differentially amplify a first node and a second node in response to the received first and second values.

7. The apparatus of claim 1 wherein the region detector is operable to take an average value for each of the pair of differential signals for each symbol.

8. An apparatus for recovering data from multi-symbol signaling comprising:
   a pre-amplifier operable to receive a carrier signal conveying a plurality of symbols, each symbol uniquely defined by a signal transition and a signal region in the carrier signal, each symbol representing a plurality of data, wherein the pre-amplifier is operable to generate a pair of differential signals for the carrier signal;
   a region detector coupled to the pre-amplifier and operable to determine the defining signal region for each symbol, wherein the region detector comprises an averaging circuit operable to store a first value for each of the pair of differential signals in a first time period and a second value for each of the pair of differential signals in a second time period, the averaging circuit operable to provide a first average value of the stored first and second values for one of the pair of differential signals and to provide a second average value of the stored first and second values for the other of the pair of differential signals; and
   a transition detector coupled to said pre-amplifier and operable to determine the defining signal transition for each symbol.

9. The apparatus of claim 8 wherein the region detector comprises a differential latch amplifier coupled to the averaging circuit, the differential latch amplifier operable to receive the first average value and the second average value, the differential latch amplifier operable to differentially amplify a first node and a second in response to the received first and second average values.

10. A receiver comprising:
    a pre-amplifier operable to receive a symbol stream and generate a differential output, wherein the symbol stream comprises a plurality of symbols with each symbol uniquely defined by a signal transition and a signal region in a carrier signal, each symbol representing a plurality of data;
    at least one region detector coupled to said pre-amplifier and operable to detect and output at least one bit from said differential output; and at least one transition detector coupled to said pre-amplifier and operable to detect and output at least one other bit from said differential output;
wherein said at least one transition detector comprises:
a differencing circuit coupled to said pre-amplifier;
a differential latch amplifier coupled to said averaging circuit; and
a hold circuit coupled to said differential latch amplifier.

11. The receiver of claim 10, wherein said at least one region detector further comprises a first region detector to process data corresponding to odd-numbered clock cycles and a second region detector to process data corresponding to even-numbered clock cycles; and
wherein said at least one transition detector further comprises a first transition detector to process data corresponding to odd-numbered clock cycles and a second transition detector to process data corresponding to even-numbered clock cycles.

12. The receiver of claim 10, wherein said pre-amplifier is further operable to receive a predetermined voltage indicating characteristics of a transmission channel through which said symbol stream was transmitted.

13. The receiver of claim 10, wherein said pre-amplifier is further operable to receive a bias voltage which biases said pre-amplifier in a saturation region to ensure linear operation.

14. The receiver of claim 10, wherein said bias voltage is process, voltage, and temperature compensated.

15. A receiver comprising:
a pre-amplifier operable to receive a symbol stream and generate a differential output, wherein the symbol stream comprises a plurality of symbols with each symbol uniquely defined by a signal transition and a signal region in a carrier signal, each symbol representing a plurality of data;
at least one region detector coupled to said pre-amplifier and operable to detect and output at least one bit from said differential output; and
at least one transition detector coupled to said pre-amplifier and operable to detect and output at least one other bit from said differential output;
wherein said at least one transition detector comprises:
a differencing circuit coupled to said pre-amplifier;
a differential latch amplifier coupled to said differencing circuit; and
a hold circuit coupled to said differential latch amplifier.

16. A method for processing transmitted symbols comprising:
receiving a symbol stream and generating a differential output, wherein the symbol stream comprises a plurality of symbols with each symbol uniquely defined by a signal transition and a signal region in a carrier signal, each symbol representing a plurality of data;
determining at least one bit from said differential output by detecting whether a portion of said symbol stream is within a defining voltage region; and
determining at least one other bit from said differential output by detecting a voltage transition in a portion of said symbol stream;
wherein said detecting whether a portion of said symbol stream is within defined voltage regions comprises:
averaging a first portion of said differential output to obtain a first average;
averaging a second portion of said differential output to obtain a second average;
amplifying the difference between said first and second averages to obtain a first and second voltage; and
processing said first and second voltages to determine said at least one bit.

17. A method for processing transmitted symbols comprising:
receiving a symbol stream and generating a differential output, wherein the symbol stream comprises a plurality of symbols with each symbol uniquely defined by a signal transition and a signal region in a carrier signal, each symbol representing a plurality of data;
determining at least one bit from said differential output by detecting whether a portion of said symbol stream is within a defining voltage region; and
determining at least one other bit from said differential output by detecting a voltage transition in a portion of said symbol stream;
wherein said detecting a voltage transition of a portion of said symbol stream comprises:
sampling said differential output;
amplifying the difference between a plurality of samples to obtain a first and second voltage; and
processing said first and second voltages to determine said at least one other bit.

* * * * *